US012350221B2

(12) United States Patent
Liu et al.

(10) Patent No.: US 12,350,221 B2
(45) Date of Patent: Jul. 8, 2025

(54) RECIPROCATING STIMULATION DEVICE

(71) Applicant: HYTTO PTE. LTD, Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/823,592

(22) Filed: Sep. 3, 2024

(65) Prior Publication Data

US 2024/0423868 A1 Dec. 26, 2024

Related U.S. Application Data

(63) Continuation of application No. 18/353,783, filed on Jul. 17, 2023, now Pat. No. 12,201,577, which is a continuation of application No. 18/307,753, filed on Apr. 26, 2023, now Pat. No. 12,178,774.

(51) Int. Cl.
*A61H 19/00* (2006.01)
*A61H 23/02* (2006.01)

(52) U.S. Cl.
CPC ......... *A61H 19/44* (2013.01); *A61H 23/0254* (2013.01); *A61H 2201/0153* (2013.01); *A61H 2201/149* (2013.01); *A61H 2201/1669* (2013.01)

(58) Field of Classification Search
None
See application file for complete search history.

(56) References Cited

U.S. PATENT DOCUMENTS

| | | | | |
|---|---|---|---|---|
| 9,339,434 | B1 | 5/2016 | Mayfield | |
| 9,717,645 | B2 | 8/2017 | Fima | |
| 10,561,572 | B2 | 2/2020 | Fima | |
| 11,077,014 | B2 | 8/2021 | Rossi | |
| 2017/0239134 | A1 * | 8/2017 | Rossi | A61H 23/02 |

FOREIGN PATENT DOCUMENTS

| | | | |
|---|---|---|---|
| CN | 2728475 | Y | 9/2005 |
| CN | 101574299 | B | 4/2011 |
| CN | 203379600 | U | 1/2014 |
| CN | 203456981 | U | 2/2014 |
| CN | 204030836 | U | 12/2014 |
| CN | 205377554 | U | 7/2016 |
| CN | 205411596 | U | 8/2016 |
| CN | 109223496 | A | 1/2019 |
| CN | 109510383 | A | 3/2019 |
| CN | 110664603 | A | 1/2020 |

(Continued)

*Primary Examiner* — Thaddeus B Cox
(74) *Attorney, Agent, or Firm* — Holtz, Holtz & Volek PC

(57) ABSTRACT

A reciprocating stimulation device includes a proximal part, a distal part disposed over the proximal part including a vibration component, a stretchable tube connecting an exterior of the distal part to an exterior of the proximal part so as to form a stimulation body configured to insert into an orifice of a human body, and a drive component configured to drive the distal part in a reciprocating manner relative to the proximal part. The stretchable tube stretches and shrinks as the distal part moves in the reciprocating manner, thereby resulting in reciprocating stimulation to a body portion of human. The drive component remains within the orifice of the human body as the distal part of the stimulation body reciprocates relative to the proximal part.

20 Claims, 29 Drawing Sheets

(56) References Cited

FOREIGN PATENT DOCUMENTS

| | | | | |
|---|---|---|---|---|
| CN | 210142956 | U | 3/2020 | |
| CN | 210246520 | U | 4/2020 | |
| CN | 211356652 | U | 8/2020 | |
| CN | 214959108 | U | 11/2021 | |
| CN | 215132896 | U | 12/2021 | |
| CN | 216216324 | U | 4/2022 | |
| CN | 114094759 | B | 5/2022 | |
| CN | 217029844 | U | 7/2022 | |
| CN | 217216255 | U | 8/2022 | |
| CN | 217328331 | U | 8/2022 | |
| JP | 2002291829 | A | 10/2002 | |
| WO | WO-2016056666 | A1 * | 4/2016 | ............. A61H 19/00 |

* cited by examiner

RECIPROCATING STIMULATION DEVICE

CROSS-REFERENCE TO RELATED APPLICATIONS

The present application is a Continuation of co-pending U.S. patent application Ser. No. 18/353,783, filed on Jul. 17, 2023, which is a Continuation of U.S. patent application Ser. No. 18/307,753, filed on Apr. 26, 2023, the entire contents of both of which are herein incorporated by reference.

TECHNICAL FIELD

The present disclosure relates to sexual stimulation devices and, more specifically, to a reciprocating sexual stimulation device.

DISCUSSION OF THE RELATED ART

Sexual stimulation devices, sometimes known as sex toys or adult toys, are designed to produce a range of different motions such as vibrating, rotating and thrusting. Thrusting motions may be generated by the action of reciprocating in which an element may move forward and backward in a line. Since such devices generally use an electric motor that is capable of producing rotational movement, reciprocating action may be produced by such mechanical elements as cams, that convert the rotational motion of the motor into reciprocating motion, or push rods mounted to a rotating disk or wheel driven to push and pull the rod generally along the reciprocating direction.

However, such existing approaches for providing reciprocating action may be poorly suited for use within sexual stimulation devices owing to inefficiencies in power utilization, the need for awkward device shaping to accommodate the needed mechanical elements, limited stroke length, weak drive force for portable arrangements, an asymmetrical ascending and descending stroke force.

SUMMARY

A reciprocating stimulation device includes a proximal part and a distal part which includes a vibration component. A stretchable tube connects an exterior of the distal part to an exterior of the proximal part so as to form a stimulation body configured to be inserted into an orifice of a human. A drive component is configured to drive the distal part in a reciprocating manner relative to the proximal part. The stretchable tube is configured to stretch and shrink as the distal part moves in the reciprocating manner, thereby resulting in reciprocating stimulation to a body portion of the human. The drive component is configured to remain within the orifice of the human body as the distal part of the stimulation body reciprocates relative to the proximal part.

A reciprocating stimulation device includes a proximal part and a distal part which is configured to stimulate a body portion of a human. The distal part includes a rotating motor disposed therein. A linear reciprocating mechanism is configured to drive the distal part to move in a reciprocating manner via a first shaft of the rotating motor. A stretchable tube connects an exterior of the distal part to an exterior of the proximal part. The stretchable tube is configured to stretch and shrink as the distal part moves in the reciprocating manner with respect to the proximal part.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
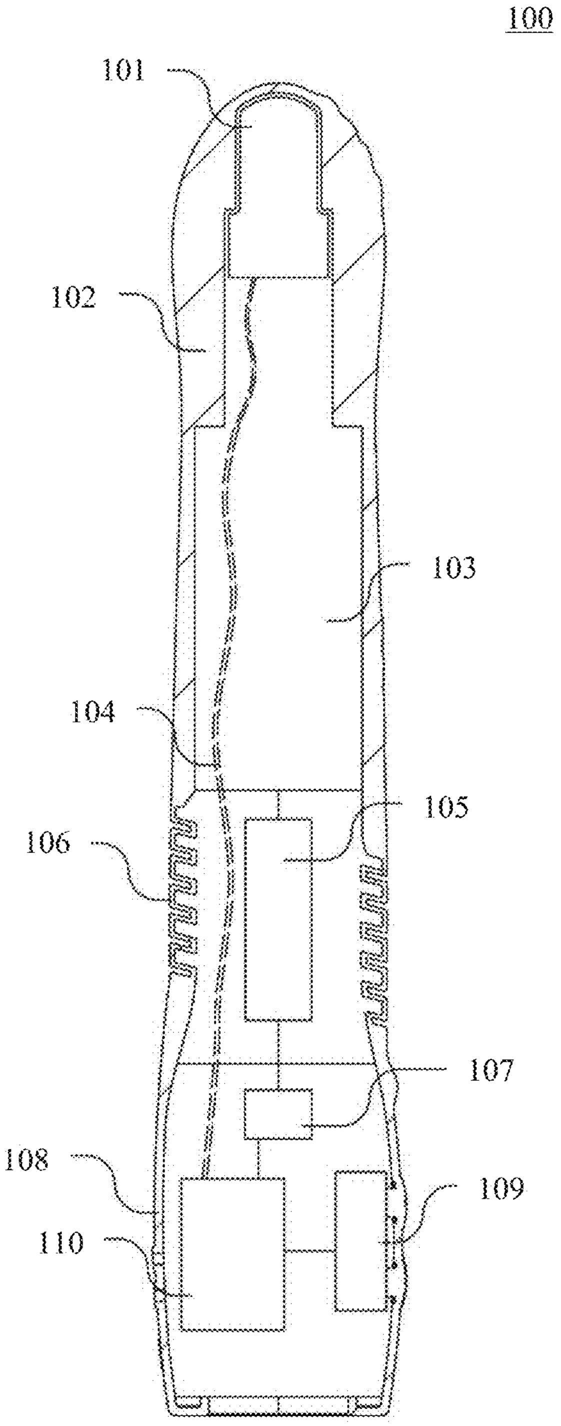
FIG. 1 is a cutaway view of a reciprocating stimulation device in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide for a sexual stimulation device that utilizes various screw-and-nut arrangement to produce reciprocating action from a single-direction rotational movement of an electric motor so as to provide a desired vector of stimulation within a compact and portable shape while efficiently making use of battery power.

For example, the sexual stimulation device may include a base assembly and a top assembly and a stretchable tube connecting the base assembly to the top assembly. A threaded screw may be secured to a rotating motor within the base assembly and so the threaded screw may be coupled to the base assembly and may be rotatably driven by the motor. The threaded screw may extend up into the top assembly but the threaded screw is not coupled to the top assembly. The top assembly may include a threaded nut or guide pin that is fixedly coupled to the top assembly and the threaded nut or guide pin may be engaged with the threaded screw. Thus, as the motor causes the screw to rotate, the top assembly may be driven up and/or down by virtue of the nut/guide pin and the stretchable tube may ensure that the top assembly remains connected to the base assembly. In this way, a reciprocating motion may be established.

The exterior of the top assembly may include a stimulation shape and so the user of the device may receive stimulation by the reciprocating motion of the top assembly relative to the base assembly. The base assembly may include a mounting means so that it may be removably mounted to a stationary object.

The directionality of the reciprocating motion may be alternated between expansion and contraction by one of several different means. For example, the rotation of the motor may be reversed so as to alternate the directionality of the reciprocating motion. Alternatively, the threaded screw may be threaded with a dual-helical groove (including an ascending groove and a descending groove, with the ascending groove being a groove responsible for driving the top assembly away from the base assembly and the descending groove being a groove responsible for driving the top assembly towards the base assembly) so that the guide pin is lifted up (the direction away the base assembly) by the rotation of the screw that is set within the ascending groove until the guide pin reaches a top of the screw at which point the accenting groove feeds into the descending groove and the guide pin is pushed down (the direction towards the base assembly) by the rotation of the screw. When the guide pin reaches the bottom of the screw, the descending groove feeds into the ascending groove and the guide pin is pushed up once more. As the guide pin is fixedly coupled to the top assembly, the top assembly exhibits the reciprocating motion as the guide pin is driven closer and farther from the base assembly.

Various other components may be included to facilitate the reciprocating motion or to add stimulation functionality to the device. Many of these components and the operation thereof will be described in detail below. However, it is to be understood that any combination of these various other components may be used in connection with the basic means of operation discussed above.

In the various figures, many of the same elements are shown in multiple figures but are not described again with respect to each and every figure in which they appear. Accordingly, it is to be assumed that to the extent that an element is not described with respect to one figure, it is at least similar to a corresponding element shown and described with respect to another figure. Like reference numerals may represent like elements throughout the specification and the figures.

FIG. 1 is a cutaway view of a reciprocating stimulation device 100 in accordance with exemplary embodiments of the present invention. The top assembly discussed above includes a stimulation body 102 and the base assembly discussed above includes a handle portion 108. The top assembly further includes a stimulation component 101 which may provide a vibrating force, for example, by the inclusion of a vibrating motor which may be supplied power from the base component by a conductive subassembly 104, which may include wires.

The base assembly may include, for example, within the handle portion 108, a rotating motor 107, which may be powered by a battery or some other power source 110, and a controller 109, which may regulate the operation of the rotating motor 107, the stimulation component 101, the charging of the battery 110, and may provide various other functions. The controller 109 may include logic circuity and may also include a microprocessor, a system-on-chip, and the like.

The controller may be programmed to allow the user to operate the device 100 by one or more buttons disposed thereon and to control various operational modes such as activation of the stimulation component 101 and the commencing of the reciprocating movement. The controller may also utilize various elements of networking hardware to allow the operation of the device 100 to be controlled either by short range wireless connection (e.g., Bluetooth) or over the Internet.

A stretchable tube 106 may bridge the exterior of the stimulation body 102 with that of the handle portion 108. The stretchable tube 106 may allow for the stimulation body 102 to get closer to and farther away from the handle portion 108 while protecting the interior of the device 100 from exposure and while protecting a user from being pinched by the device 100.

The rotating motor 107, under the control of the controller 109, may rotate and drive a linear reciprocating mechanism 105. The linear reciprocating mechanism 105 may utilize one or more screws, such as a screw pair, a nut and/or guide pin, electromagnetic reciprocating mechanism, crank reciprocating mechanism, reciprocating swashplate type mechanism, as described above, to pull the stimulation body 102 closer to and farther away from the handle portion 108. An interior of the stimulation body 102 may include a loaded member 103, which is an element that is being driven by the linear reciprocating mechanism 105. As the loaded member 103 is fixedly coupled to the stimulation body 102, the reciprocating motion of the loaded member 103 is transferred to the stimulation body 102.

Figure 2:
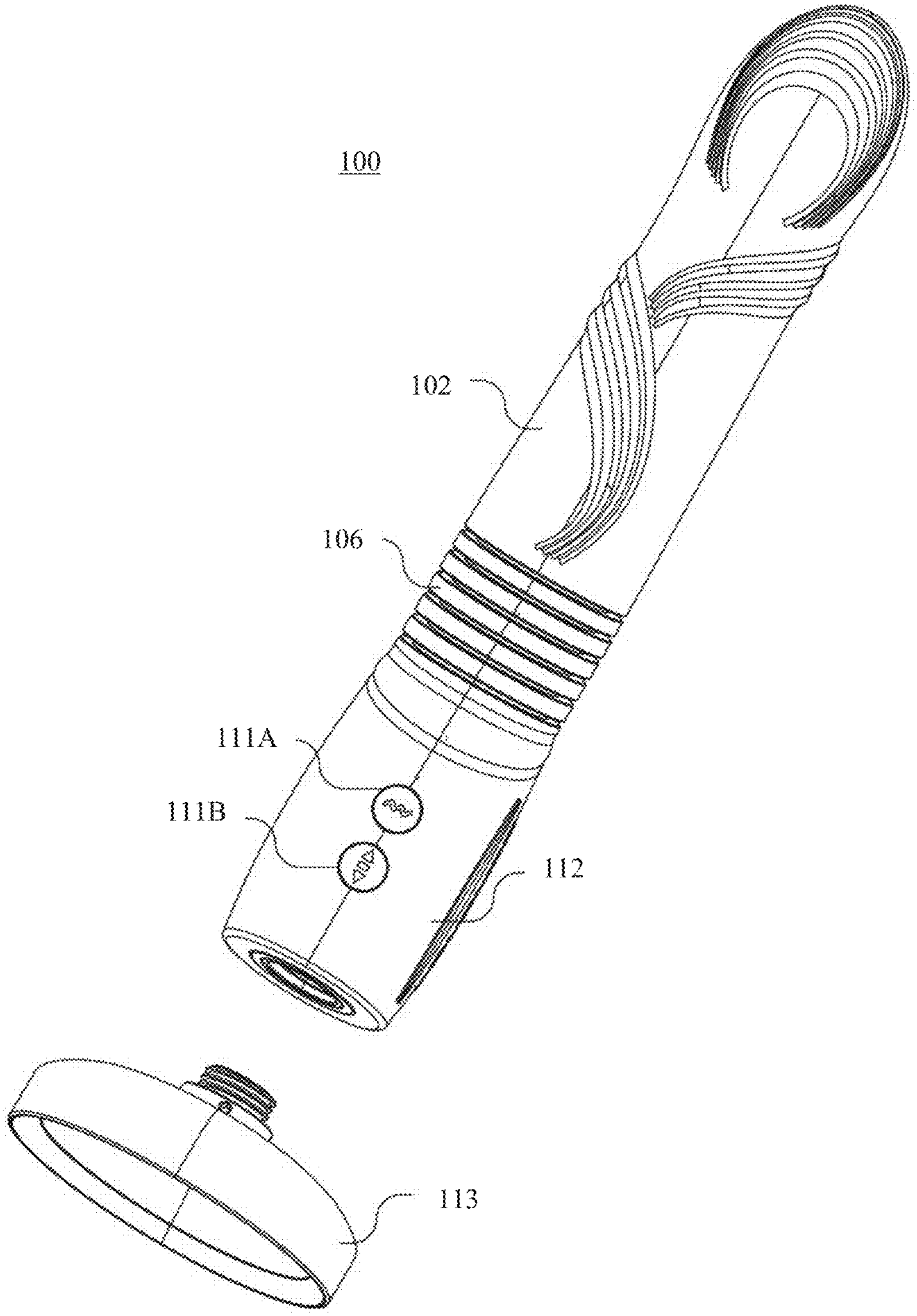
FIG. 2 is a perspective view of the reciprocating stimulation device in accordance with exemplary embodiments of the present invention.

FIG. 2 is a perspective view of the reciprocating stimulation device 100 in accordance with exemplary embodiments of the present invention. As can be seen from this figure, the stimulation body 102 may include various exterior elements, such as recessed channels and raised ribs, to provide stimulation to the user. The stretchable tube 106 may include a ribbed elastic membrane for expansion and contraction. For example, the stretchable tube 106 may include silicone or soft bellows. The stretchable tube 106 may be formed of a single continuous membrane that encapsulates both the stimulation body 102 and the handle portion 108 so as to provide a continuous impermeable skin around the device 100. The stimulation body 102, the stretchable tube 106, and the handle portion 108 may each be substantially cylindrical, with all three elements being arranged concentrically. All three elements may share a common diameter or the diameters may be within 6 mm or less from one another. Alternatively, each of these three elements may have its own diameter with these diameters differing from one another by more than 6 mm.

An exterior of the handle portion 108 may include various control elements such as a first button 111A for controlling vibration of the stimulation component 101 and a second button 111B for controlling the reciprocating movement. The first button 111A may, for example, be used to toggle though vibrational modes while the second button 111B may, for example, be used to start/stop reciprocating movement. The second button 111B may also be used to maximally extend or maximally retract the loaded member 103.

A controlling portion 112 may also be disposed on the exterior of the handle portion 108, as shown, for providing additional input/output. The controlling portion 112 may, for example, include a touchscreen, buttons, knobs, controls, etc.

A detachable base 113 may be configured to mate with the handle portion 108 so that the device 100 may be mounted to a fixed structure during use. The detachable base 113 may have a threaded post for screwing into a threaded cavity of the handle portion 108 and an opposite end of the detachable base 113 may be a suction cup or some other means of attachment.

Figure 3:
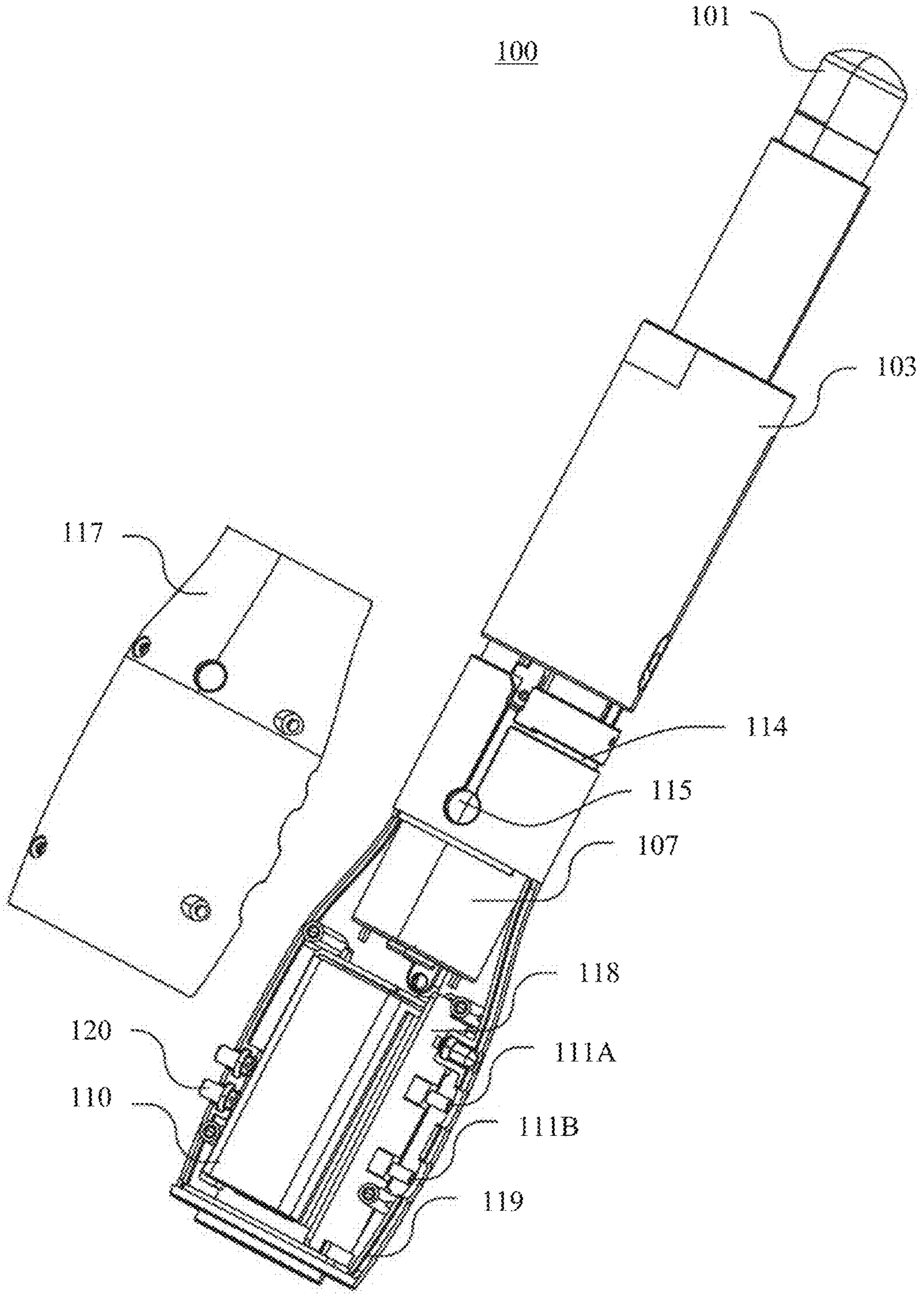
FIG. 3 is an exploded view of the reciprocating stimulation device in accordance with exemplary embodiments of the present invention.

FIG. 3 is an exploded view of the reciprocating stimulation device 100 in accordance with exemplary embodiments of the present invention. This figure shows the base assembly including a removable shell 117 that engages with a stationary shell 119, for example, by screws. The removable shell 117 can be removed to expose the battery 110, the rotating motor 107, and various other components. The device 100 may additionally include a charging port 120, the first and second buttons 111A/B discussed above, and a printed circuit board (PCB) 118.

A trunking 114 may be included behind the removable shell 117 as a protected passageway for the wires and/or other conductive elements to extend from the rotating motor 107 to the PCB 118. These wires and/or other conductive elements may also pass through an opening 115 disposed behind the removable shell 117.

Within the stimulation body 102 (not illustrated), the loaded member 103 and the stimulation component 101, may be housed.

Figure 4:
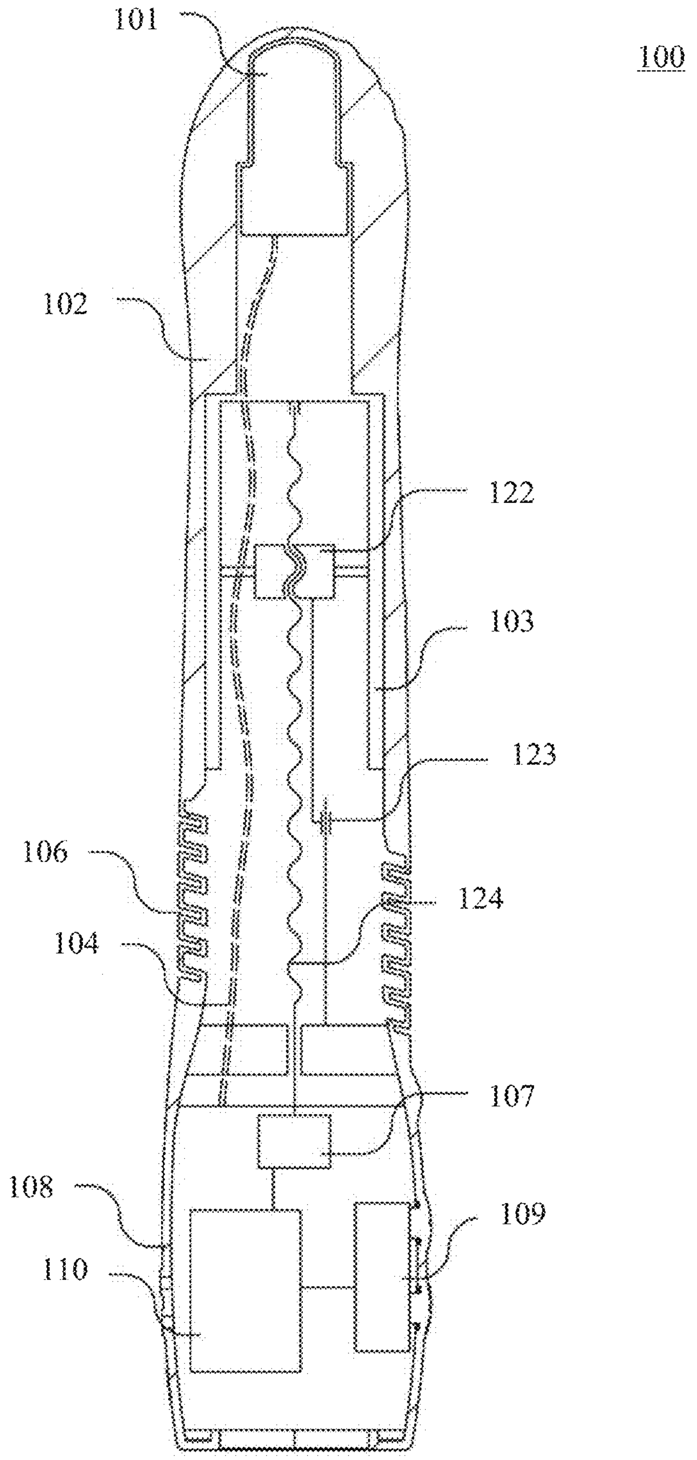
FIG. 4 is a cutaway view of a reciprocating stimulation device in accordance with exemplary embodiments of the present invention.

FIG. 4 is a cutaway view of a reciprocating stimulation device 100 in accordance with exemplary embodiments of the present invention. While FIG. 1 illustrated the use of a linear reciprocating mechanism 105, which may be a general mechanism for providing reciprocating motion, the arrangement of FIG. 4 illustrates a specific approach for implementing reciprocating motion. Here, the handle portion 108 is again illustrated as including a battery/power source 110, a controller 109, and a rotating motor 107. The stimulation body 102 is again illustrated as being connected to the handle portion 108 by the stretchable tube 106. However, the loaded member 103 is shown as including a nut 122 that is fixedly coupled to the loaded member 103, for example, by a longitudinal force receiving structure, e.g., cross bar. The nut is threaded so as to mate with the helical groove of the screw 124 and so as the screw is turned by the rotating motor 107, the nut 122 is pushed towards and away from the handle portion 108 and the nut 122 carries the loaded member 103 along with it. A guiding member 123 helps stabilize the nut 122, and thereby the stimulation body 102, to the handle portion 108 so that lateral sway and instability may be minimized. This may be implemented by a first post that is fixed to the nut 122, a second post that is fixed to the interior of handle portion 108, and a sliding arrangement for slidably arranging the first and second post to one another. A conductive subassembly 104 may extend from the controller 109 and/or battery 110 to the stimulation component 101, which may include a vibrating motor so as to power and drive the stimulation component 101. According to this arrangement, the directionality of the reciprocating motion may be controlled by controlling the direction of rotation of the rotating motor 107, by the controller 109. By periodically alternating the direction of spin of the rotating motor 107, a desired reciprocating motion may be achieved.

Figure 5:
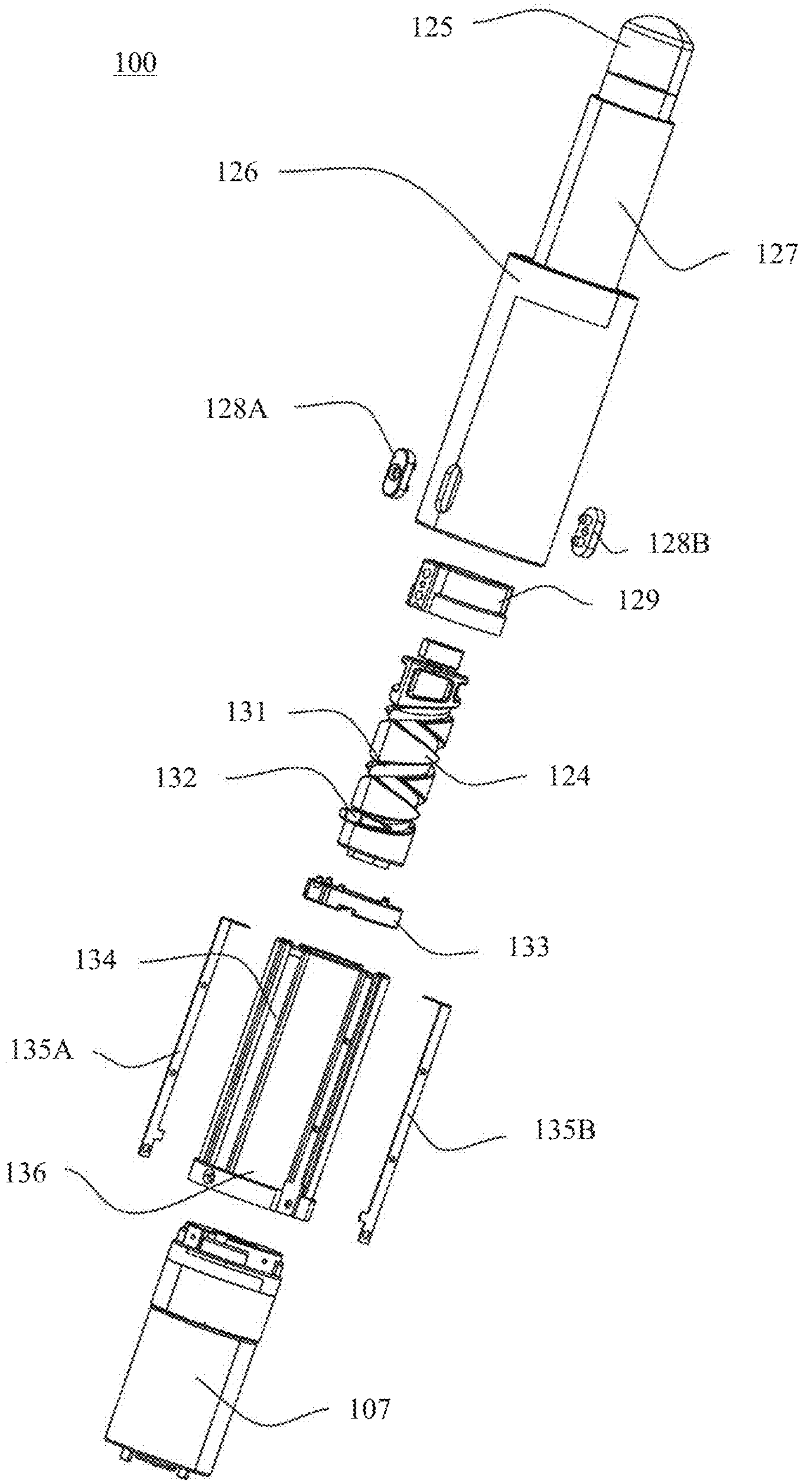
FIG. 5 is an exploded view of a reciprocating stimulation device utilizing a dual-helical grooved screw in accordance with exemplary embodiments of the present invention depicted in FIG. 4.

As discussed above, according to an alternative approach, the desired reciprocating motion may be achieved without needing to periodically reverse the direction of spin of the rotating motor 107. According to this approach, a screw 124 having dual-helical grooves may be employed. FIG. 5 is an exploded view of a reciprocating stimulation device 100 utilizing a dual-helical grooved screw 124 in accordance with exemplary embodiments of the present invention. Here an inner sleeve 136 may be disposed over the rotating motor 107. The inner sleeve 136 may include a linear guiding hole 134. The screw 124 may also be disposed within the inner sleeve 136. The screw 124 is mated to the rotating motor 107 such that the rotating motor 107 spins the screw 124. The screw 124 has a dual-helical groove 131 in its surface that may include an ascending helical groove and a descending helical groove (i.e., levorotatory helical groove and a dextrorotatory helical groove). The two helical grooves are interlaced with one another and are connected end-to-end at both the top and bottom of the screw 124.

A nut is formed by the lower cover 133 and the upper cover 129 which come together with the guide pin 132. The guide pin 132 protrudes from the linear guide hole 134 of the inner sleeve 136. Thus, as the rotating motor 107 rotates, the nut formed by the lower cover 133 and the upper cover 129 move up or down depending on which of the two helical grooves the guide pin 132 is presently disposed within as the nut is prevented from rotation by the disposition of a bump within the linear guiding hole 134. As discussed above, the direction of travel of the nut changes as the guide pin 132 reaches either the top or bottom of the screw 124 and then passes to the other groove.

It is to be understood that the nut arrangement may include more than one guide pin 132, for example, it may include a pair of bumps disposed at opposite sides of the nut and these bumps may each be seated with a different linear guide hole 134 of the inner sleeve 136 and so there might be two linear guide holes 134 on opposite sides of the inner sleeve 136 to correspond to the pair of bumps. This may provide added stability over an embodiment in which there is only one bump being used.

An outer sleeve 126 is coupled to the nut formed by the lower cover 133 and the upper cover 129 by the placement of one or more mounts 128A and 128B. Thus, as the nut moves up and down, it carries the outer sleeve 126 up and down along with it. A support 127 is coupled to the outer sleeve 126 and a case 125 is coupled to the support 127 and in this way, the case 125 of the device 100 may achieve the desired reciprocating motion.

Power may be conducted from the base of the device to the top of the device, for example, to power a vibrational motor or other stimulation component disposed therein, by a pair of conductive strips 135A and 135B that may be disposed around the inner sleeve 136. Each of the conductive strips 135A and 135B may be electrically connected to a wire at its bottom that connects to the power source and a wire at its top that connects to the vibrational motor or other stimulation component. By using conductive strips in this manner, friction may be reduced between the inner sleeve 136, that remains stationary relative to the base, and the outer sleeve 126, that moves up and down relative to the base, as using wires between these two sleeves might well interfere with the reciprocating movement.

Figure 6:
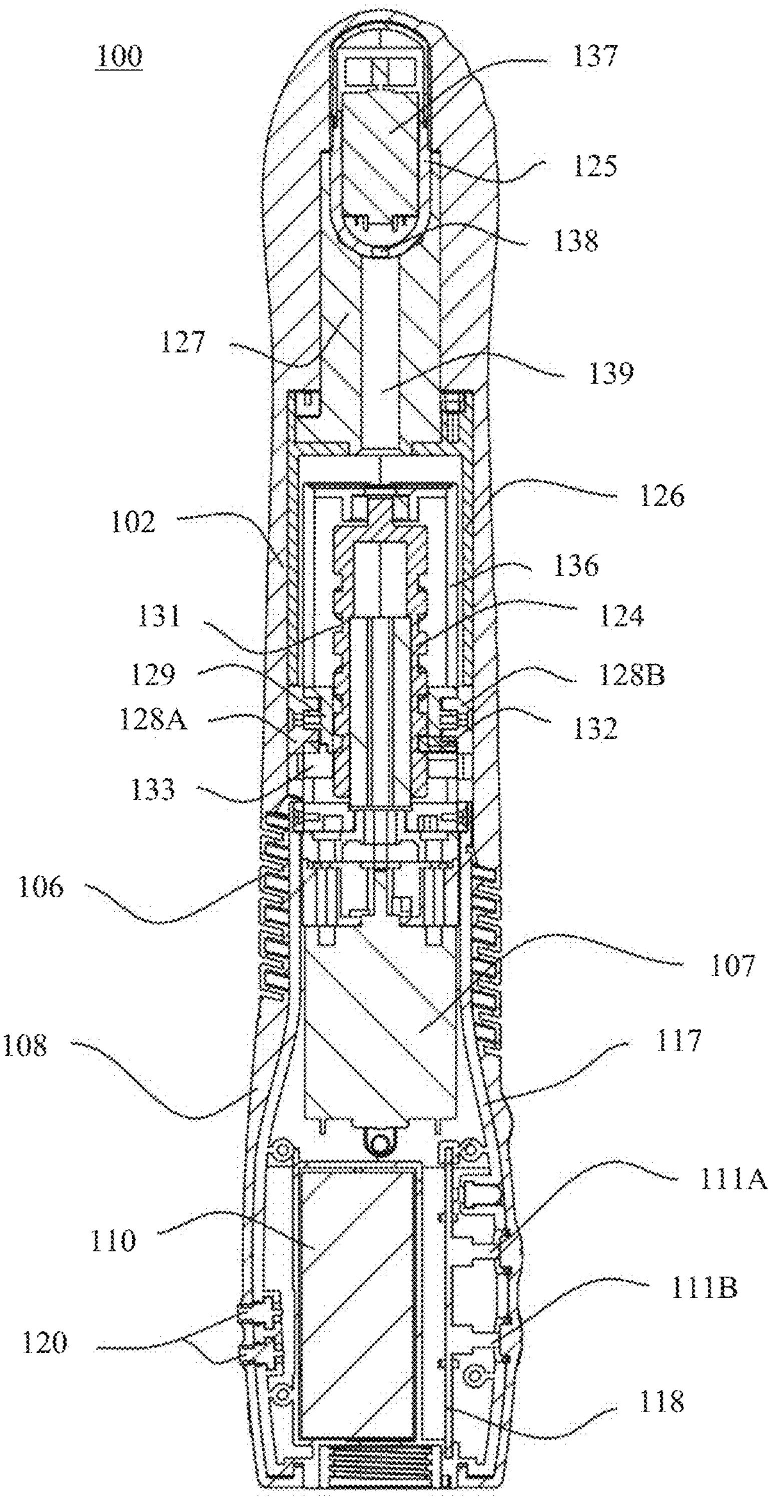
FIG. 6 is a cutaway view of the reciprocating stimulation device shown in FIG. 5.

FIG. 6 is a cutaway view of the reciprocating stimulation device 100 shown in FIG. 5. The device 100 is illustrated here in its fully retracted state where the outer sleeve 126 is disposed around the inner sleeve 136. Here, the handle portion 108 encases the shell 117, the power source/battery 110, the rotating motor 107, and the PCB 118 with controller disposed thereon. The charging ports 120 and the buttons 111A/111B may protrude from the shell 117 and handle portion 108.

The handle portion 108 is again bridged with the stimulation body 102, on the exterior, by the stretchable tube 106. Within the inner sleeve 136, the screw 124 with its dual-helical grooves is coupled to the rotating motor 107. The lower cover 133 comes together with the upper cover 129 to form the nut that engages with the grooves 131 of the screw 124, for example, with the guide pin 132. A pair of mounts 128A and 128B fix the nut assembly, including the lower cover 133, the upper cover 129, and the guide pin 132, to the outer sleeve 126. The outer sleeve 126 is coupled to the stimulation body 102 and above the outer sleeve 126, and within the stimulation body 102, is the support 127. A chamber 139 may run through the support 127 and wires may run within the chamber 139, emerge through a first hole 138 in the case 125 so as to power the vibrating motor 137 disposed within the top of the stimulation body 102.

Figure 7:
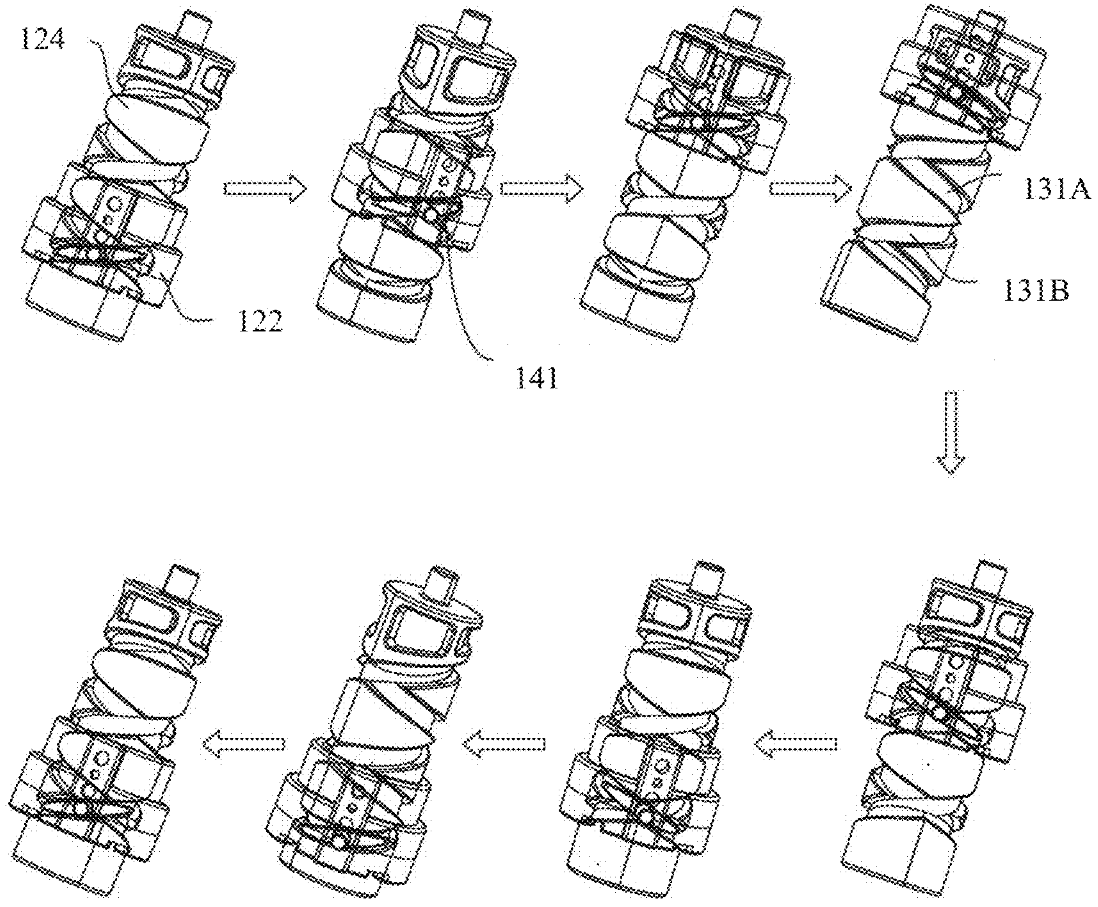
FIG. 7 is a set of perspective views of the screw with the nut assembly disposed thereon, as seen in FIGS. 5 and 6.

FIG. 7 is a set of perspective views of the screw 124 with the nut assembly disposed thereon, as seen in FIGS. 5 and 6. The nut assembly, including the lower cover 133, the upper cover 129, the guide pin 132 and the pair of mounts 128A and 128B are together shown in transparent outline form so that the engagement of the nut assembly about the rotating screw 124 may be more clearly visualized. As the screw 124 rotates in one direction, the nut assembly travels up and down along the screw 124 for one complete cycle, which then continues to provide the aforementioned reciprocating motion.

Figure 8:
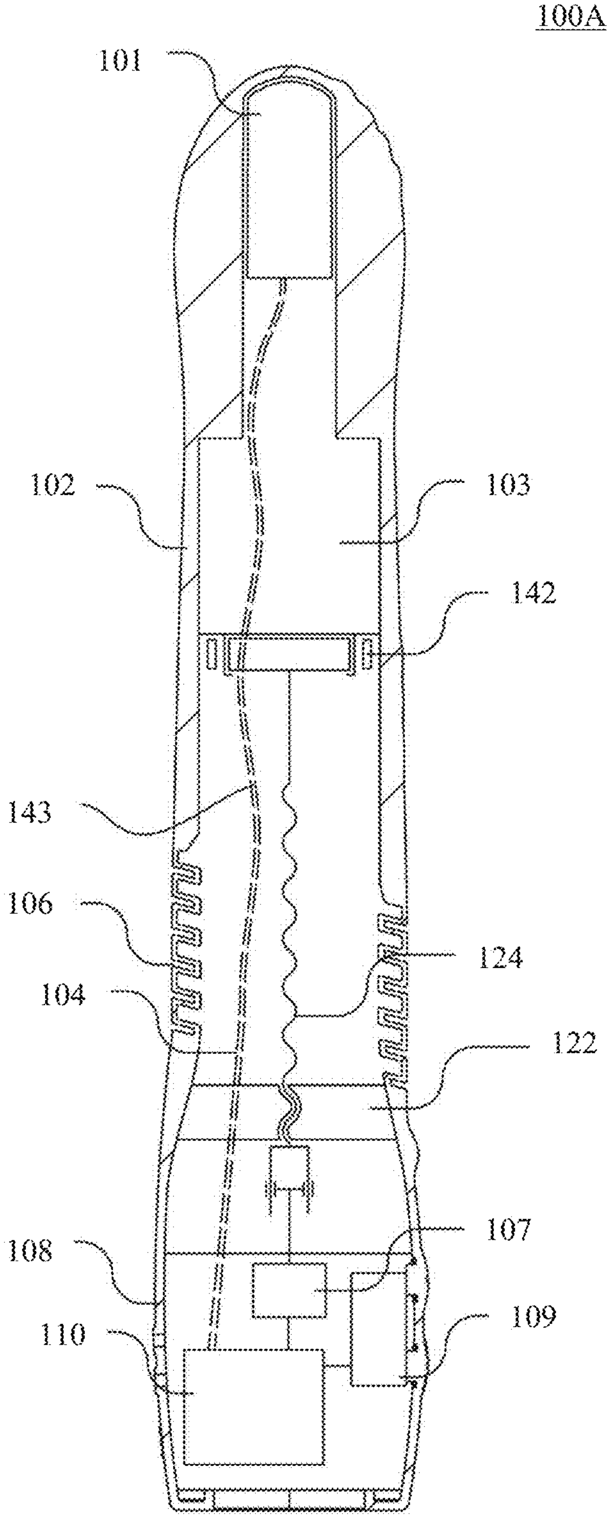
FIG. 8 is a cutaway view of a reciprocating stimulation device in accordance with exemplary embodiments of the present invention.

FIG. 8 is a cutaway view of a reciprocating stimulation device 100A in accordance with exemplary embodiments of the present invention. It is to be assumed that to the extent that one or more elements of the device are not described in detail with respect to this figure, those elements may be at least similar to corresponding elements described elsewhere within the present disclosure.

Here, the screw 124 may have the same dual-helical groove arrangement as is described above. This arrangement also includes the battery/power source 110, rotating motor 107, and controller 109 disposed within the handle portion 108 but here, the nut 122 is stationary within the handle portion as the nut 122 is fixed to the interior of the handle portion 108 by the use of a fixing ring. A torque receiving structure may be used to couple the rotating motor 107 to the screw 124 so as to rotate the screw 124 by the rotation of the motor 107. However, here as the nut 122 is stationary with respect to the handle portion 108, the screw 124 is drawn up and down within the stationary nut 122 as the screw turns. Thus, the torque receiving structure is configured to impart turning force to the screw 124 while the screw 124 remains free to move up and down.

A conductive subassembly 104 carries power from the battery/power source 110 to a conducting subassembly 143 and from there power is carried to the stimulation component 101. A stretchable tube 106 again bridges the exterior of the handle portion 108 with that of the stimulation body 102. The screw 124 is mated to a ball bearing 142 that is then mated to the loaded member 103 so that the screw 124 can push and pull the loaded member 103 up and down without the loaded member 103 having to rotate along with the rotation of the screw 124. In this way, the reciprocating motion of the screw 124 can be imparted to the loaded member 103 without the rotational movement of the screw 124 affecting the loaded member 103.

Once again, the loaded member 103 is mated to the stimulation body 102 so that the stimulation body 102 exhibits the reciprocating movement.

Figure 9:
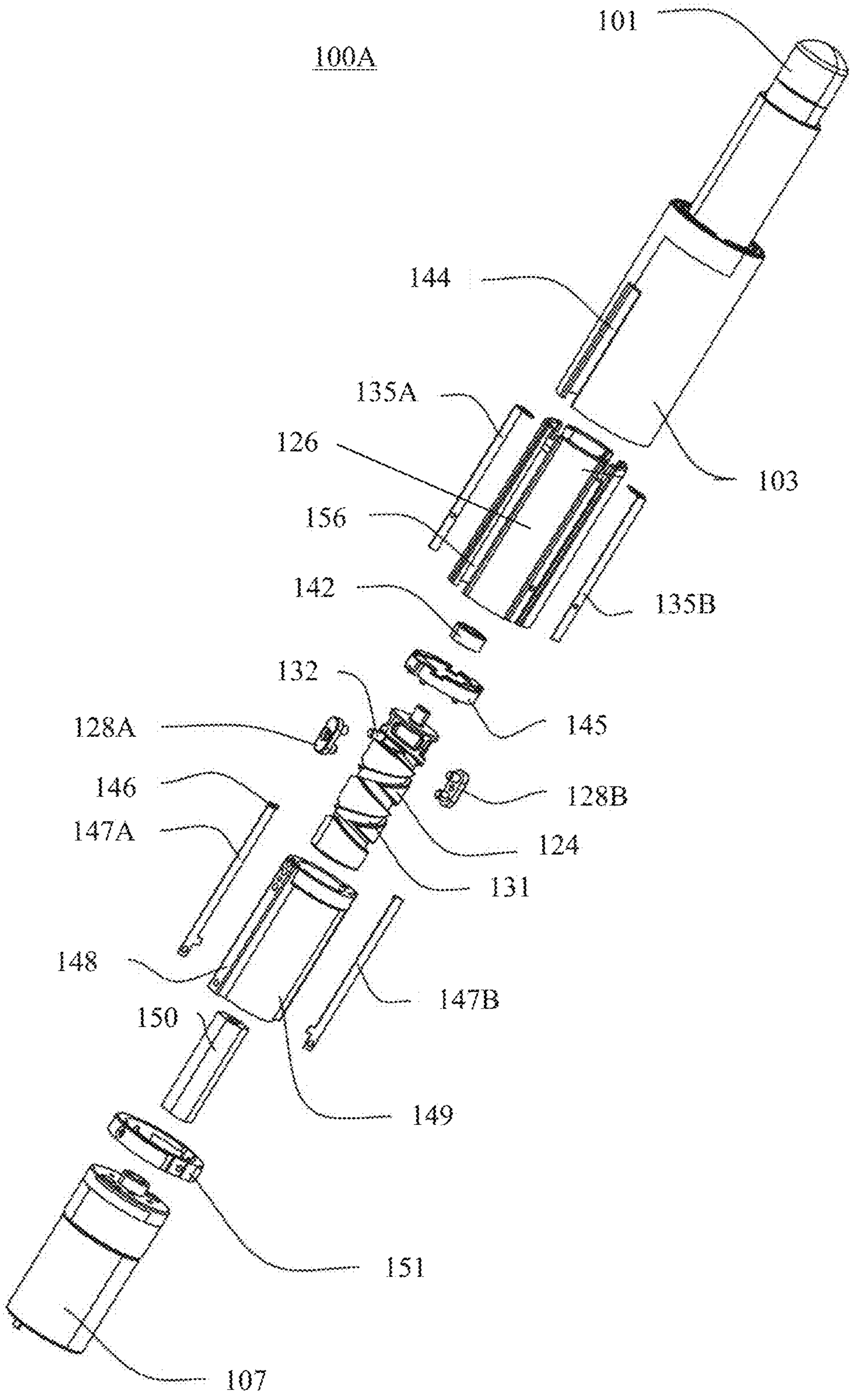
FIG. 9 is an exploded view of the reciprocating stimulation device depicted in FIG. 8.

FIG. 9 is an exploded view of the reciprocating stimulation device 100A depicted in FIG. 8. Here the rotating motor 107 turns the torque receiving structure 150 which in turn imparts turning force to the screw 124. A cylinder 149 with a hollow interior may be held in place by a ring-shaped base 151 and these elements may together be fixed with respect to the handle portion. A pair of conductive scrapers 147A and 147B may be mated to the cylinder 147 and may carry power from the battery. Each of the conductive scrapers 147A and 147B includes an arc-shaped contact 146 at a top end thereof. The arc-shaped contacts 146 establish an electrical connection with corresponding conductive strips 135A and 135B, which are part of the reciprocating structure and thus, the arc-shaped contacts 146 of the conductive scrapers 147A and 147B scape along the conductive strips 135A and 135B as the conductive strips 135A and 135B exhibit the reciprocating motion, so as to maintain the electrical connection and carry power up the device 100A and to the stimulation component 101. The conductive scrapers 147A and 147B and the conductive strips 135A and 135B may each be formed of a graphite brush (e.g., carbon brush).

The nut assembly includes the cylinder 149, the mounts 128A and 128B, the guide pin 132, and the upper cover 129/fixing ring 145 that fixes the guide pin 132 in place to the cylinder 149, the ring-shaped base 151 that fixes the cylinder 149 in place to the handle portion 108 such that the nut assembly does not move with respect to the handle portion 108.

The screw 124 is rotated by the rotating motor 107 via the torque receiving structure 150 with allows the screw 124 to freely move up and down as it is rotated. The screw 124 is mated to the loaded member 103 via the ball bearing 142 so that the screw can impart reciprocating movement to the loaded member 103, without the screw imparting its rotational movement to the loaded member 103.

The loaded member 103 includes an inner sleeve and an outer sleeve with the inner sleeve having openings 156 and the outer sleeve having corresponding linear guide grooves 144 that engage with guiding raised lines 148 of the nut so as to provide additional stability to the loaded member 103 as it is drawn up and down. The pair of conductive strips 135A and 135B may be disposed along an outer surface of the inner sleeve and the pair of conductive scrapers 147A and 147B may project between the inner sleeve and the outer sleeve of the loaded member 103. The nested nature of the inner sleeve within the outer sleeve may serve to press the conductive scrapers 147A and 147B against the conductive strips 135A and 135B so as to make a good electrical connection.

Figure 10:
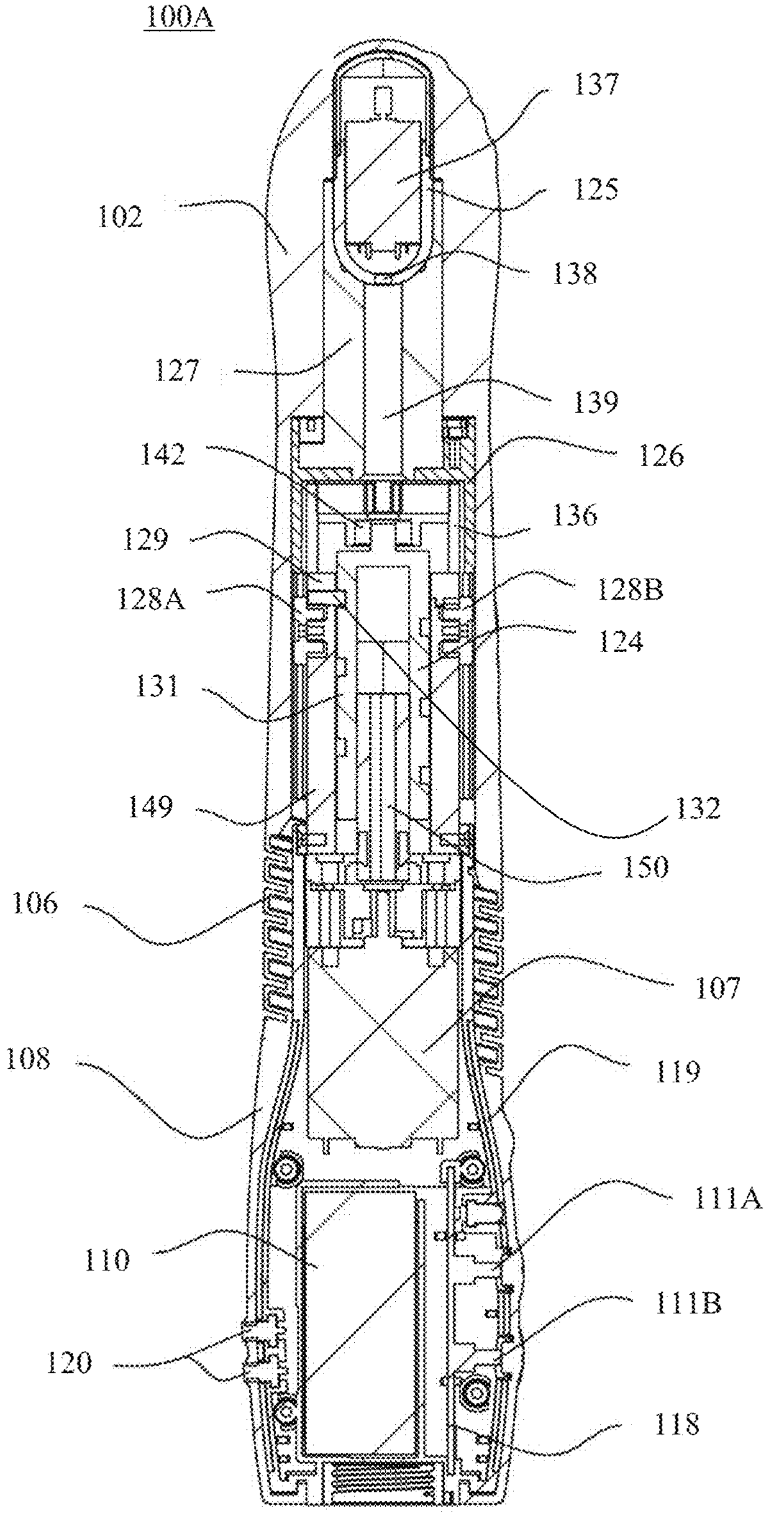
FIG. 10 is a cutaway view showing the reciprocating stimulation device of FIGS. 8 and 9.

FIG. 10 is a cutaway view showing the reciprocating stimulation device 100A of FIGS. 8 and 9. As can be seen from this figure, the handle portion 108 contains the battery 110, the PCB 118, the shell 119, the charging ports 120, the buttons 111A and 111B, and the rotating motor 107. The torque receiving structure 150 imparts rotational force from the motor 107 to the screw 124 while leaving the screw 124 free to move up and down. The screw has the dual-helical grooves 131. The stretchable tube 106 bridges the exterior of the handle portion 108 with the stimulation body 102. The cylinder 149 holds the guide pin 132 in place, the nut including the pair of mounts 128A and 128B. The upper cover 129 mates the guide pin 132 to the cylinder 149. The loaded member includes the inner sleeve 136 and the outer sleeve 126. The ball bearing 142 mates the screw 124 to the loaded member, including the sleeves 126 and 136, leaving the screw 124 free to rotate. The support 127 is mated to the loaded member and includes a chamber 139 for wires to pass from the conductive subassemblies to the vibrating motor 137, while passing through the first hole 138 of the case 125.

Figure 11:
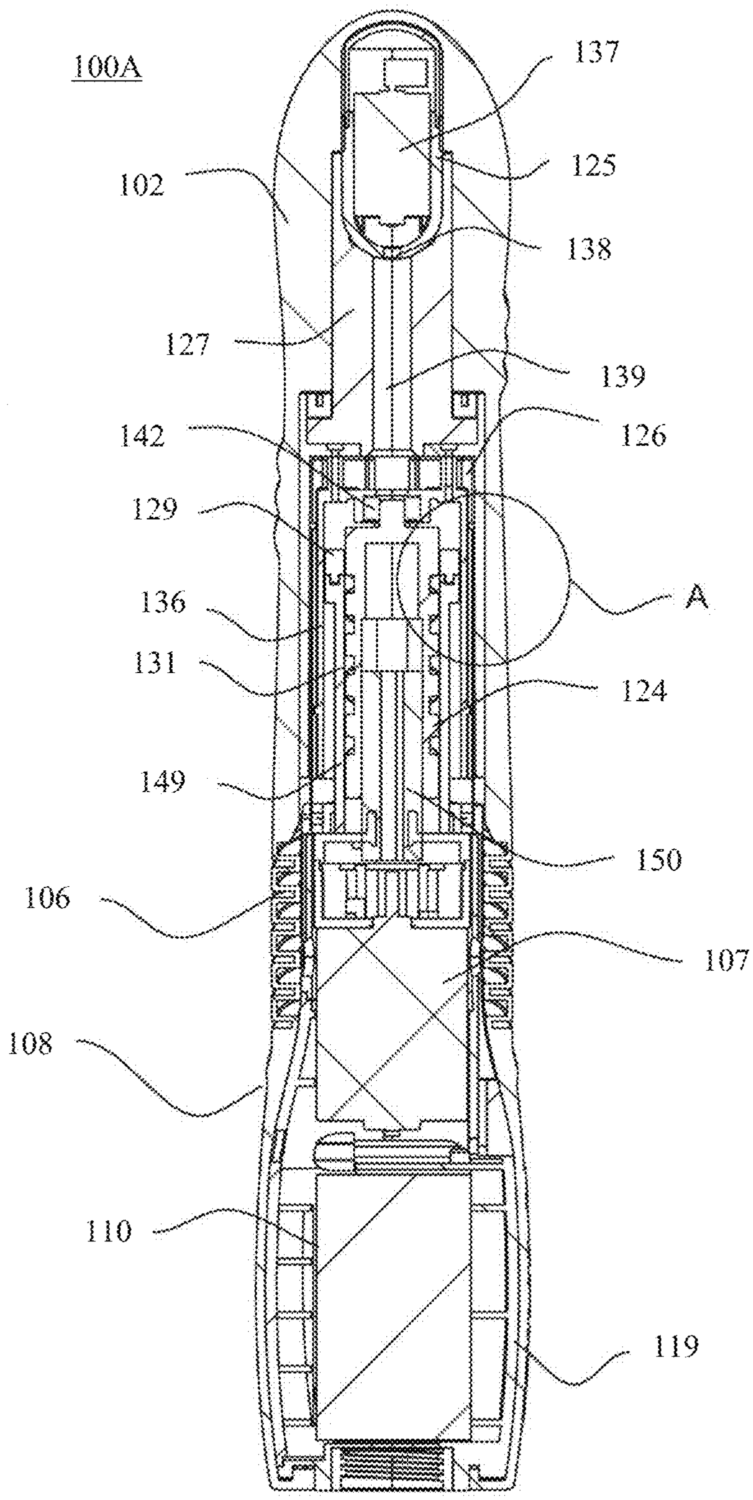
FIG. 11 is another cutaway view showing the reciprocating stimulation device of FIGS. 8, 9, and 10.
Figure 12:
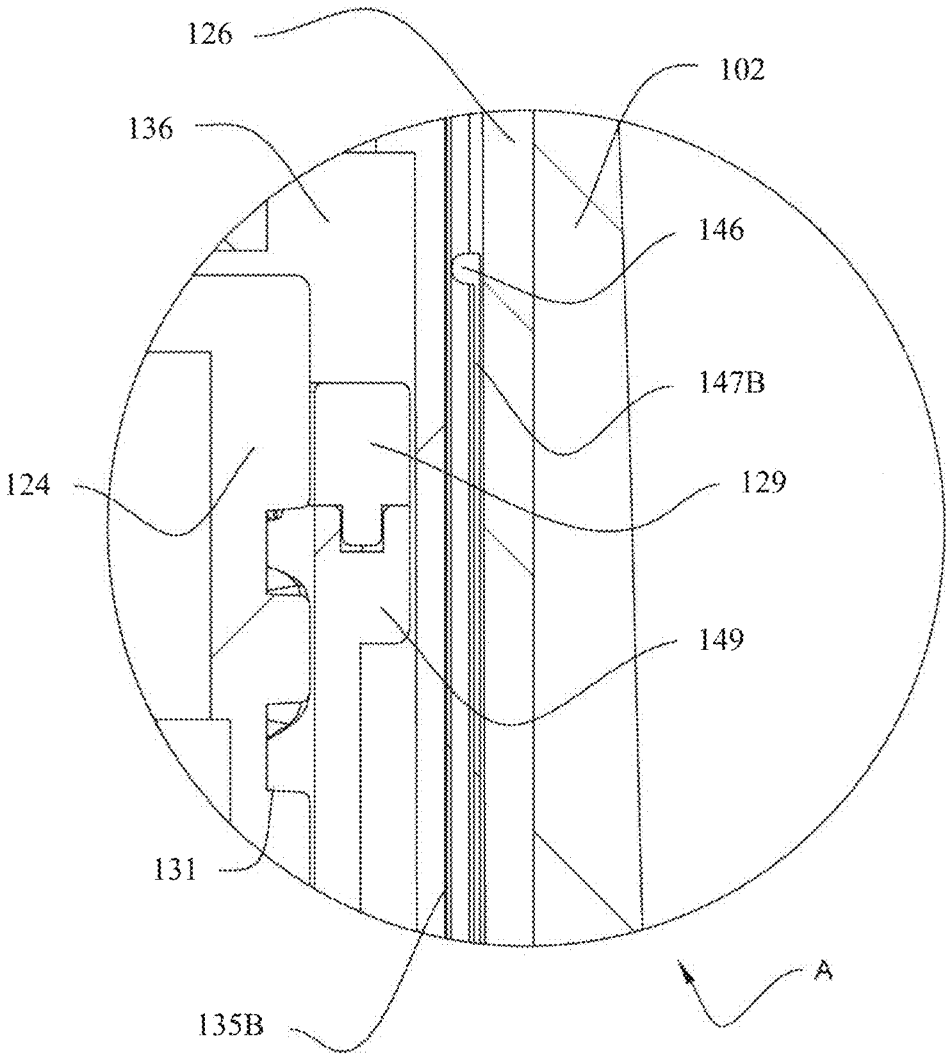
FIG. 12 is an enlarged section of section "A" shown in FIG. 11.

FIG. 11 is another cutaway view showing the reciprocating stimulation device 100A of FIGS. 8, 9, and 10. As can be seen from this figure, there is a section “A” that is enlarged in FIG. 12. FIG. 12 is therefore an enlarged section of what is shown in FIG. 11, section “A.” According to this figure, within the stimulation body 102 the outer sleeve 126 can be seen. Between the outer sleeve 126 and the inner sleeve 136, the arc-shaped contact 146 of the concoctive scraper 147B presses against and makes electrical contact with the conductive strip 135B. The upper cover 129 is fixed to the cylinder 149 and thus the pair do not move. The screw 124 is shown as having dual-helical grooves 131.

Figure 13:
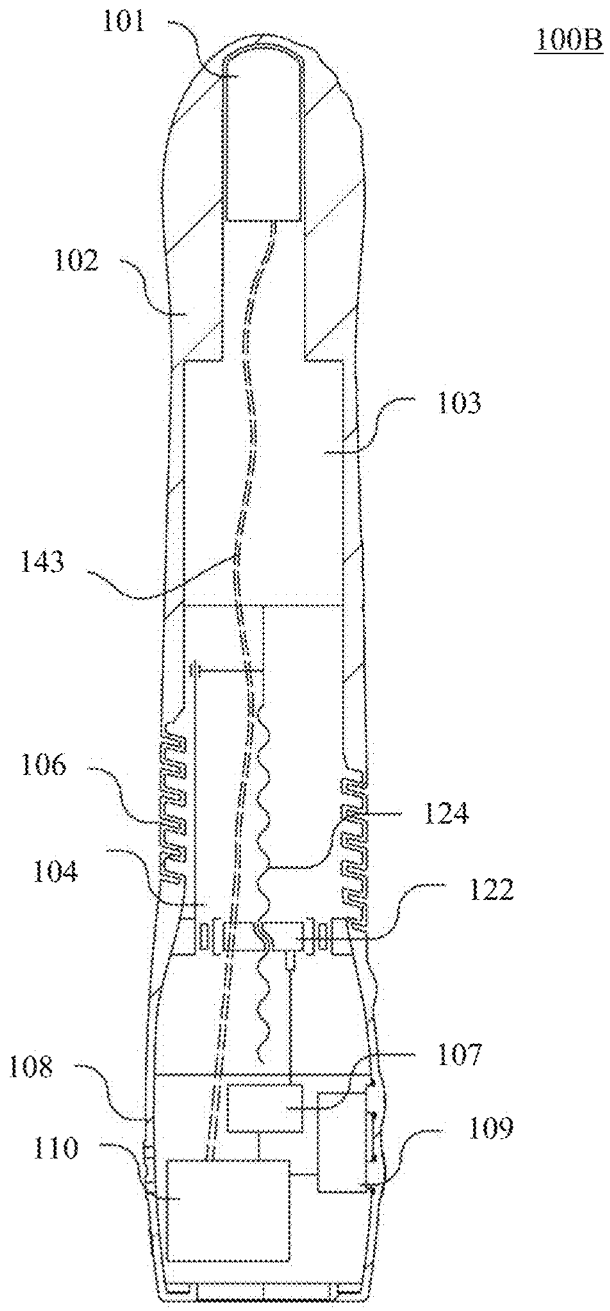
FIG. 13 is a cutaway view of a reciprocating stimulation device in accordance with exemplary embodiments of the present invention.

FIG. 13 is a cutaway view of a reciprocating stimulation device 100B in accordance with exemplary embodiments of the present invention. According to this arrangement, the top of the screw 124 is directly coupled to the loaded member 103 and so the screw moves up and down but does not turn. Instead, the nut 122 is held in place within the handle portion 108, in terms of the up-and-down direction, but is free to rotate. The rotational force of the motor 107 is used to spin the nut 122 by the use of the torque receiving structure 150 and the spinning of the nut 122 pushes the screw 124 up and down without rotating the screw 124. It is to be assumed that to the extent that one or more elements of the device are not described in detail with respect to this or other figures, those elements may be at least similar to corresponding elements described elsewhere within the present disclosure.

Figure 14:
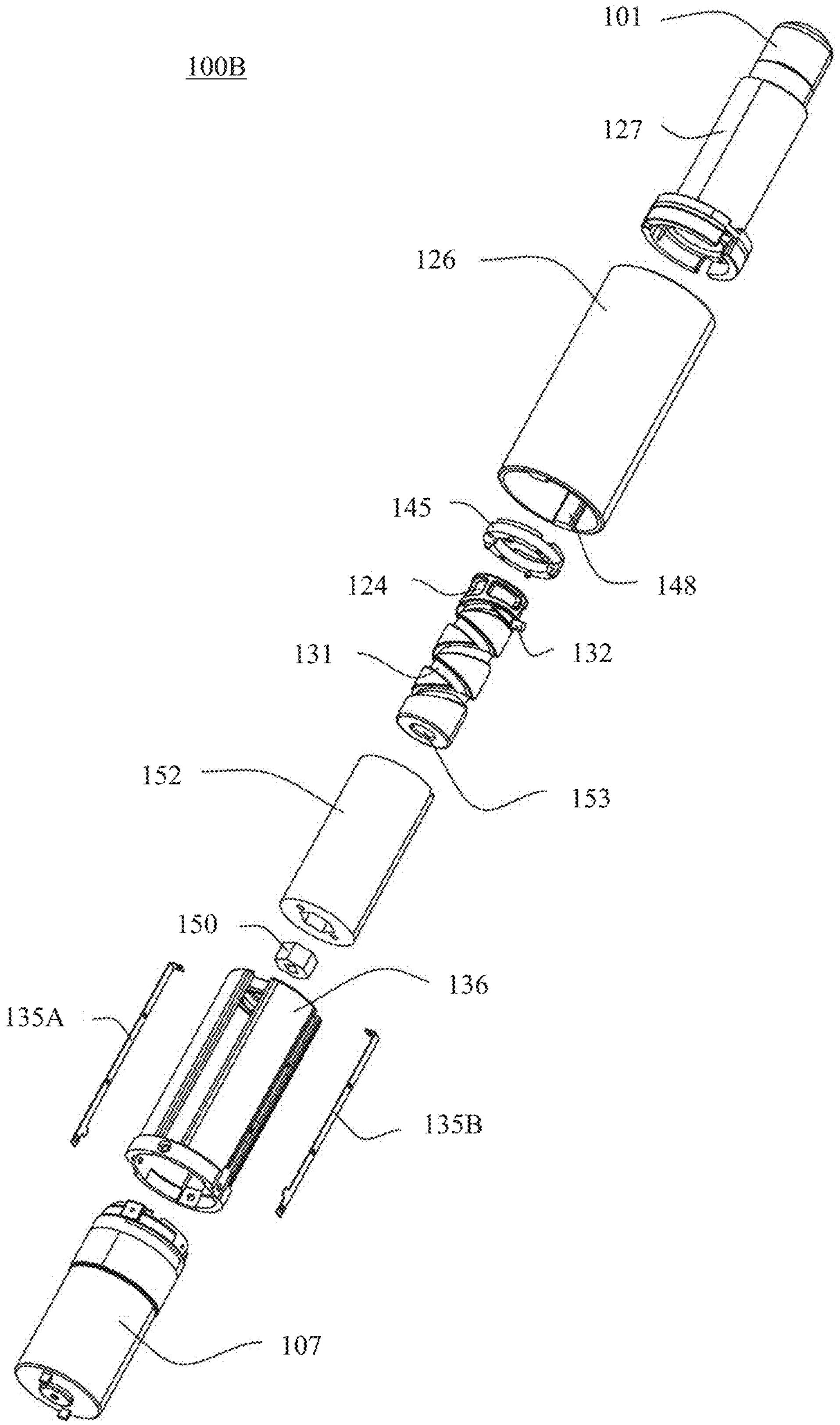
FIG. 14 is an exploded view of the reciprocating stimulation device shown in FIG. 13.

FIG. 14 is an exploded view of the reciprocating stimulation device 100B shown in FIG. 13. Here, the screw 124 is placed inside the outer sleeve 126. Thus, in this configuration, the screw 124 does not turn but rather the nut arrangement spins so as to force the screw 124 up and down. The nut assembly includes the guide pin 132 engaged with the dual-helical grooves 131 of the screw 124. A container 152 engages with the guide pin 132 such that as the container 152 is rotated, the guide pin 132 is spun and thus, the guide pin 132 pushes the screw 124 up and down as the guide pin 132 spins within the grooves of the screw 124. A fixing ring 145 fixes the guide pin 132 to the container 152. Thus, as the container 152 spins about the screw 124, the guide pin 132 is spun and the screw exhibits reciprocating movement. The torque receiving structure 150 imparts the rotational movement of the motor 107 to the container 152. The inner sleeve 136 envelops the container 152 but the inner sleeve 136 does not rotate as it may be affixed to the stationary casing of the motor 107. The outer sleeve 126 is disposed around the inner sleeve 136 and the outer sleeve 126 pulls up and down, away from the inner sleeve 136 as the conductive strips 135A and 135B carry electrical power. One or more raised guiding lines 148 of the outer sleeve 126 engage with corresponding linear guiding groove 144 (see, for example, FIG. 9) of the inner sleeve 136 so as to provide stability as the outer sleeve 126 raises and lowers against the inner sleeve 136.

The container 152 is shaped as an outer cylindrical shell and a concentric inner cylinder (e.g., the “limited post” 155). The outer cylindrical shell surrounds the screw 124 and the limited post 155 is disposed within a limited chamber 153 within an interior of the screw. The outer shell and limited post 155 of the container 152 are connected to one another by a bottom cap of the container 152 that includes a polygonal opening to receive the torque receiving structure 150. In this way, the rotational force of the motor 107 spins the container 152.

The limited chamber 153 is disposed within interior of the screw and is shaped to receive the limited post 155 so that the container 152 can freely rotate about the screw 124.

The bottom cap of the container 152 may include an opening that is polygonal, for example, hexagonal. The torque receiving structure 150 may be disposed within the opening of the bottom cap of the container 152 so as to spin the container 152 about the screw, as discussed above. As the container 152 spins about the screw 124, the screw 124 moves up and down by virtue of the guide pin 132 which is spun by the container 152. The bottom cap of the container 152 may include one or more air vents so as to allow air to freely enter and leave the space between the container 152 and the screw 124.

Figure 15:
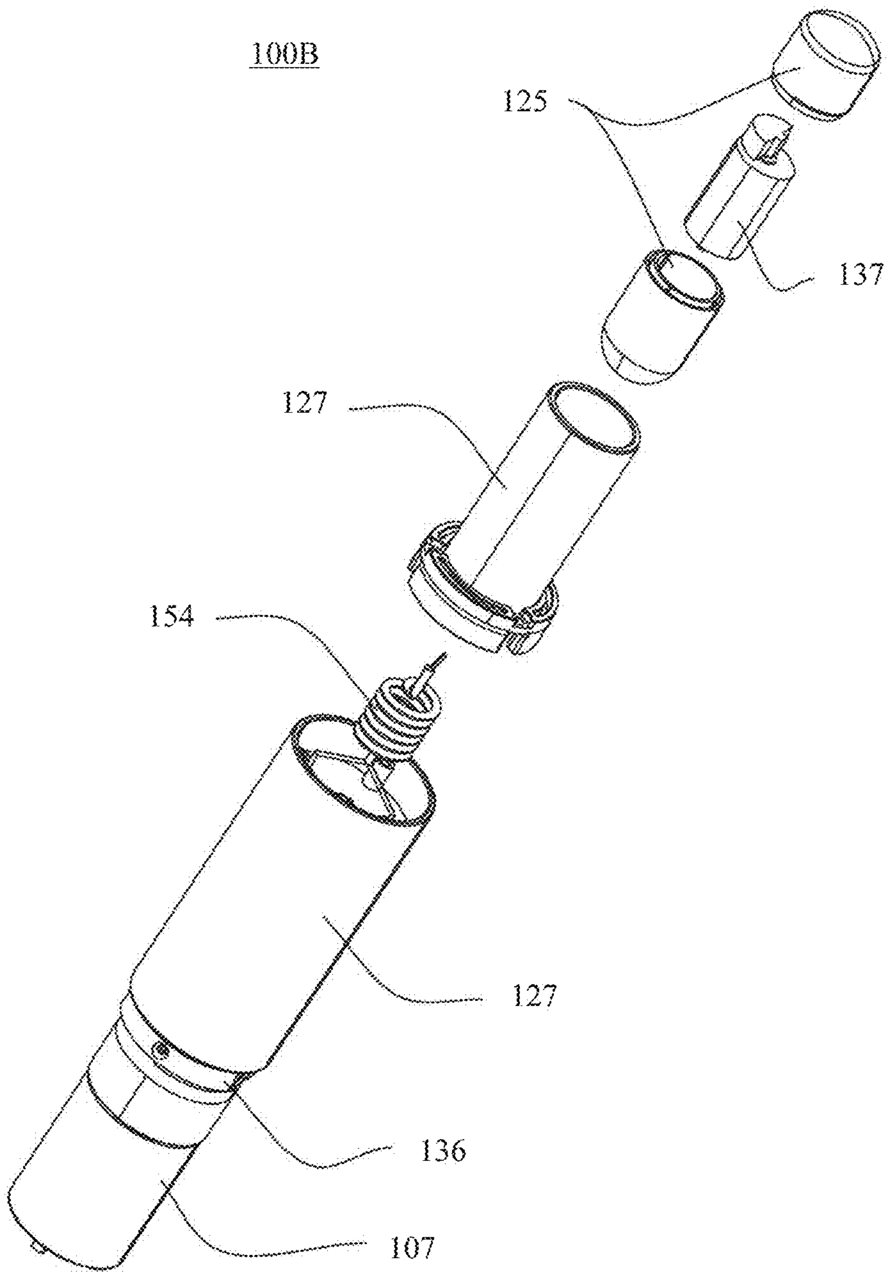
FIG. 15 is an exploded view of the reciprocating stimulation device shown in FIGS. 13 and 14.

FIG. 15 is an exploded view of the reciprocating stimulation device 100B shown in FIGS. 13 and 14. Here we can see the motor 107 meeting the inner sleeve 136 with the support 127 surrounding the inner sleeve 136. A spring shaped pipe line 154 is electrically connected to the conductive strips 135A and 135B so as to receive power therefrom and transfer the power to wires running within the support 127 and connected to the vibrating motor 137 within the case 125 through the first hole discussed above.

Figure 16:
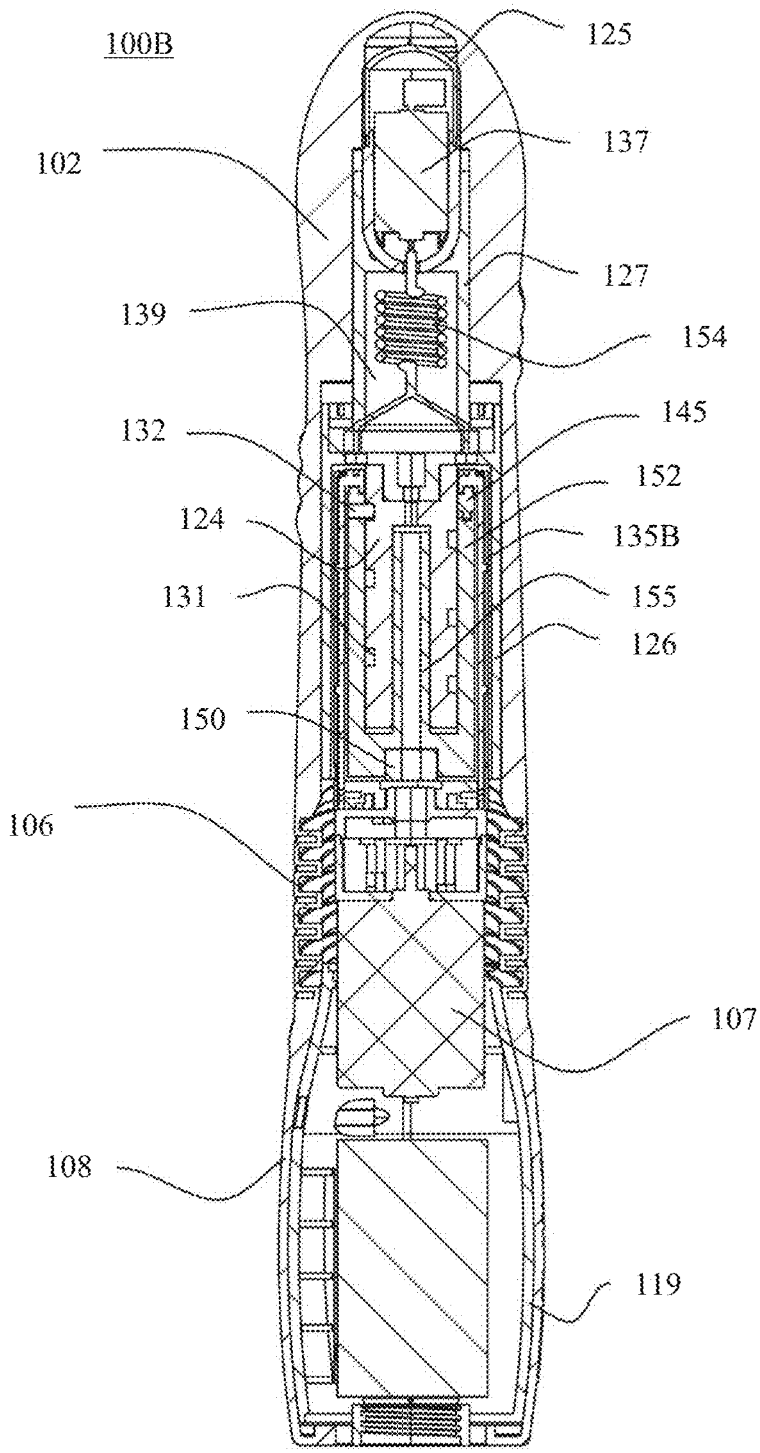
FIG. 16 is a cutaway view of the reciprocating stimulation device shown in FIGS. 13, 14, and 15.

FIG. 16 is a cutaway view of the reciprocating stimulation device 100B shown in FIGS. 13, 14, and 15. Here, the engagement of the container 152 about the screw 124 may be well appreciated. Also, the manner of electrical connection from the conductive strip 135B to the spring-shaped pipe line 154 may be seen.

Figure 17:
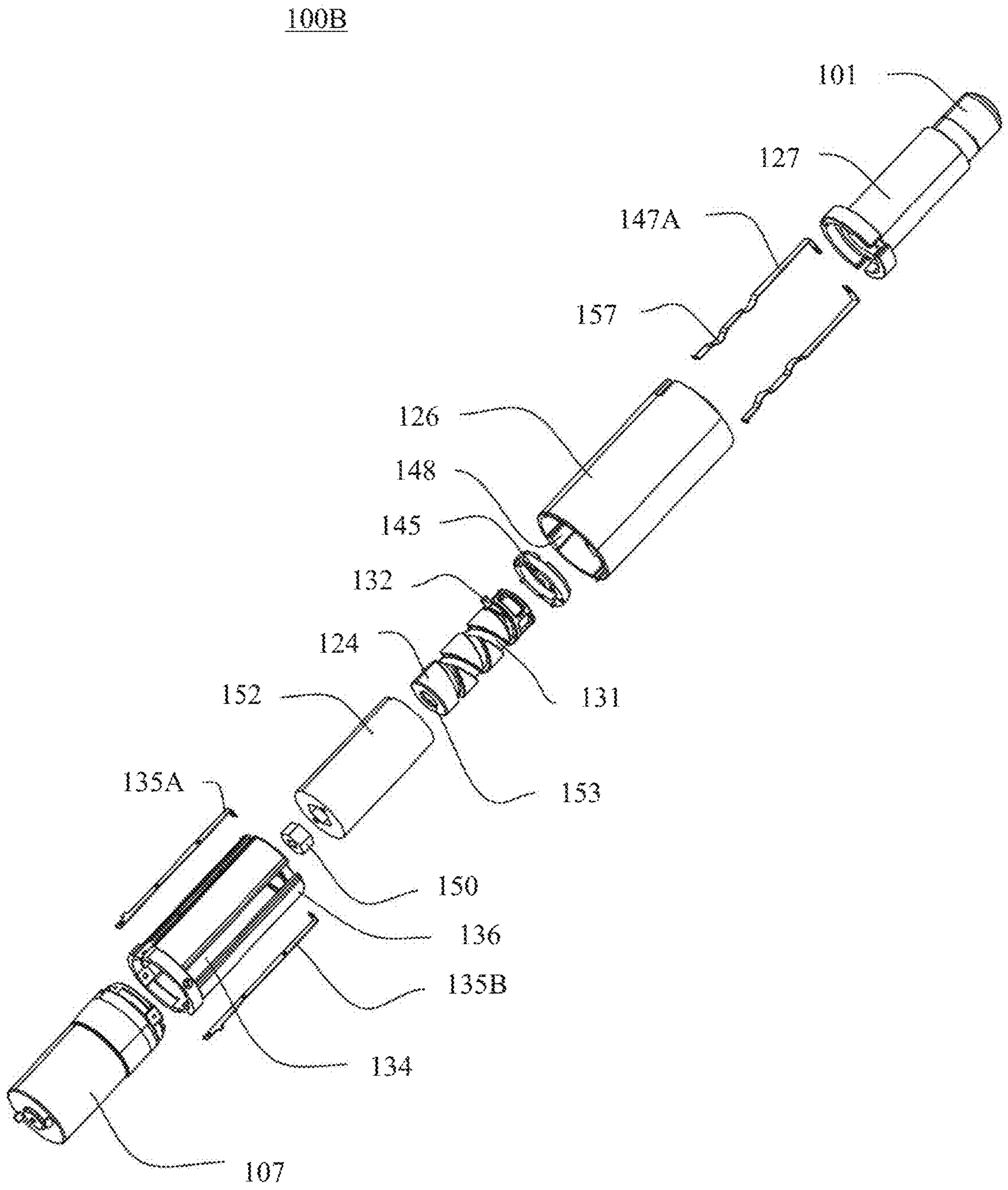
FIG. 17 is an exploded view of a reciprocating stimulation device in accordance with exemplary embodiments of the present disclosure depicted in FIG. 16.

FIG. 17 is an exploded view of a reciprocating stimulation device 100B in accordance with exemplary embodiments of the present disclosure. This arrangement may be similar to the arrangement shown in FIGS. 13-16 but for an arrangement of the conductive subassemblies. Thus, to the extent that a description of one or more elements of this or any other figure has been omitted, it may be understood that these elements are at least similar to corresponding elements that are described in detail with respect to other figures.

Here, a pair of conductive scrapers, represented by at least 147B, make contact with the corresponding pair of conductive strips 135A and 135B and so deliver power up to the vibrating motor 137 within the stimulation component 101 by wires that may extend from the vibrating motors to the conductive scrapers. Once again, the conductive scrapers may continue to make electrical contact with the conductive strips, between the inner and outer sleeves, even as the conductive scrapers are drawn away and back towards the conductive strips. Electrical contact may be made by the use of one or more raised contacts on the conductive scrapers. The conductive strips may use permanent magnets, for example, made from rubidium, to make a more significant connection to the conductive scrapers. The conductive strips may be connected to the battery/power source by additional wires.

Figure 18:
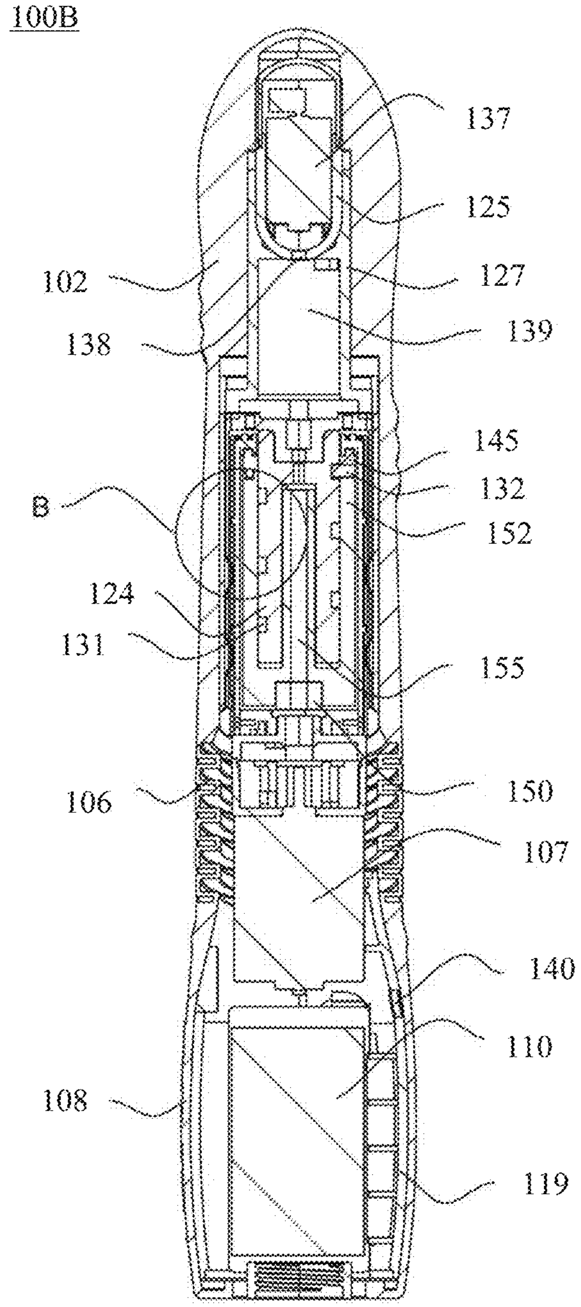
FIG. 18 is another cutaway view showing the reciprocating stimulation device of FIGS. 13-17.
Figure 19:
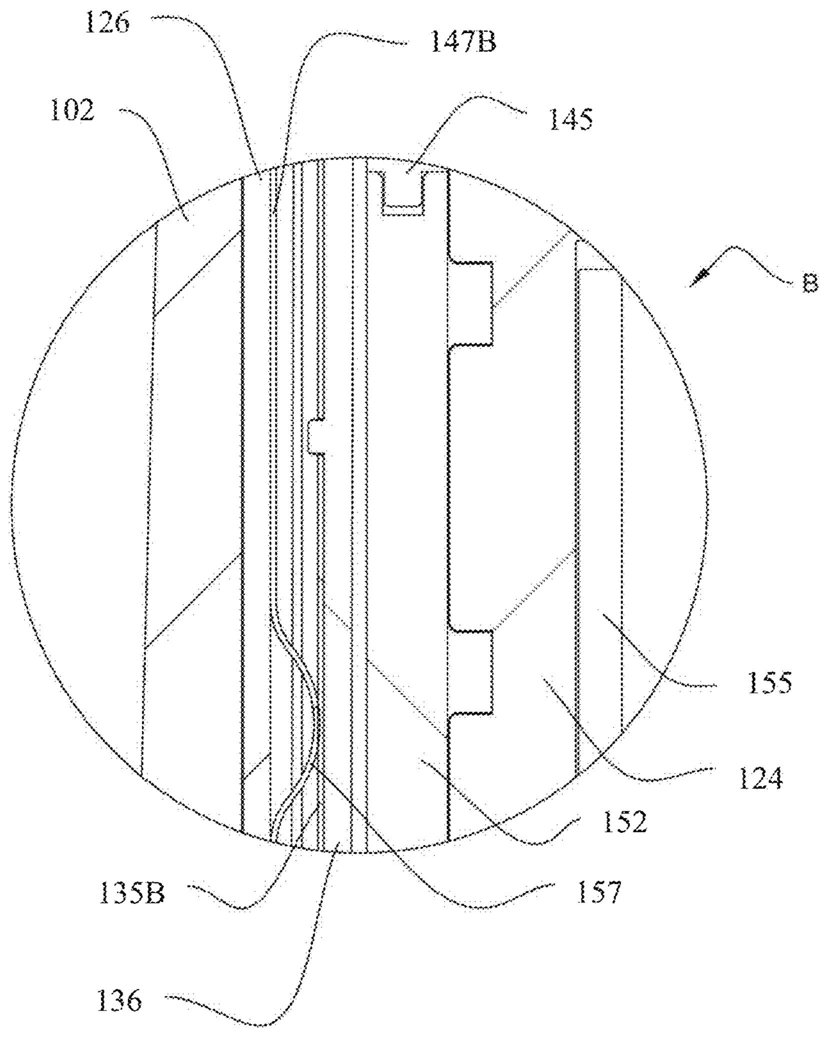
FIG. 19 is an enlarged section of section "B" shown in FIG. 18.

FIG. 18 is another cutaway view showing the reciprocating stimulation device 100B of FIGS. 13-17. As can be seen from this figure, there is a section "B" that is enlarged in FIG. 19. FIG. 19 is therefore an enlarged section of what is shown in FIG. 18, section "B." In this figure, the interior of the screw 124 (e.g., limited chamber) may be seen with the limited post 155 disposed therein. The container 152 is shown as surrounding the screw 124 with the fixed ring 145 engaging with the top of the container 152. The inner sleeve 136 is then shown around the container with the outer sleeve 126 around the inner sleeve 136. Between the inner sleeve 136 and the outer sleeve 126 is the conductive strip 135B shown to make contact with the conductive scraper 147B. These components are all within the stimulation body 102.

Figure 20:
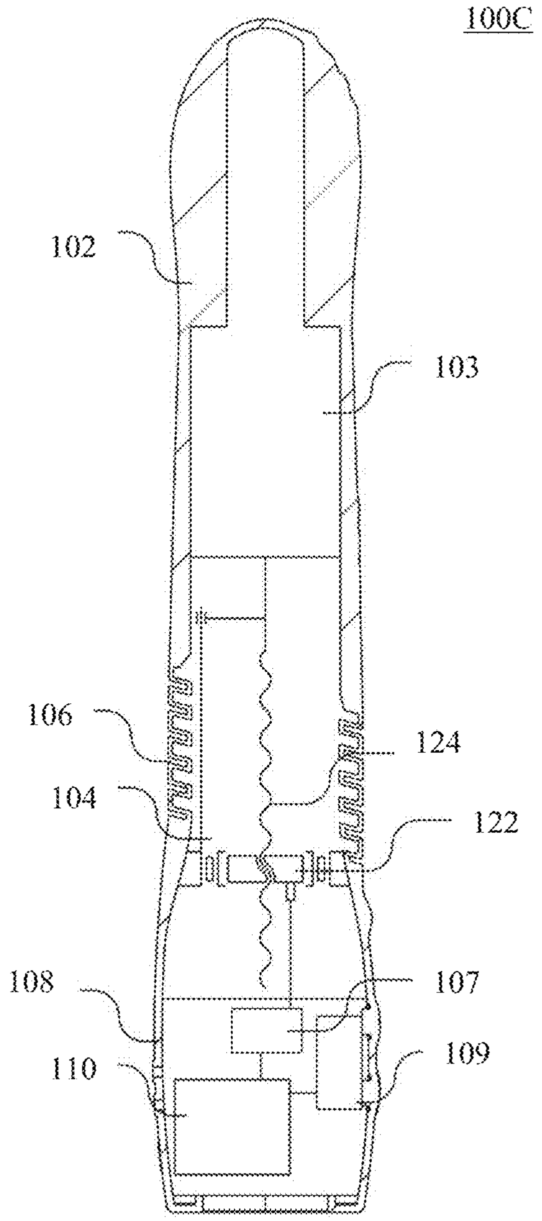
FIG. 20 is a cutaway view of a reciprocating stimulation device in accordance with exemplary embodiments of the present invention.
Figure 29:
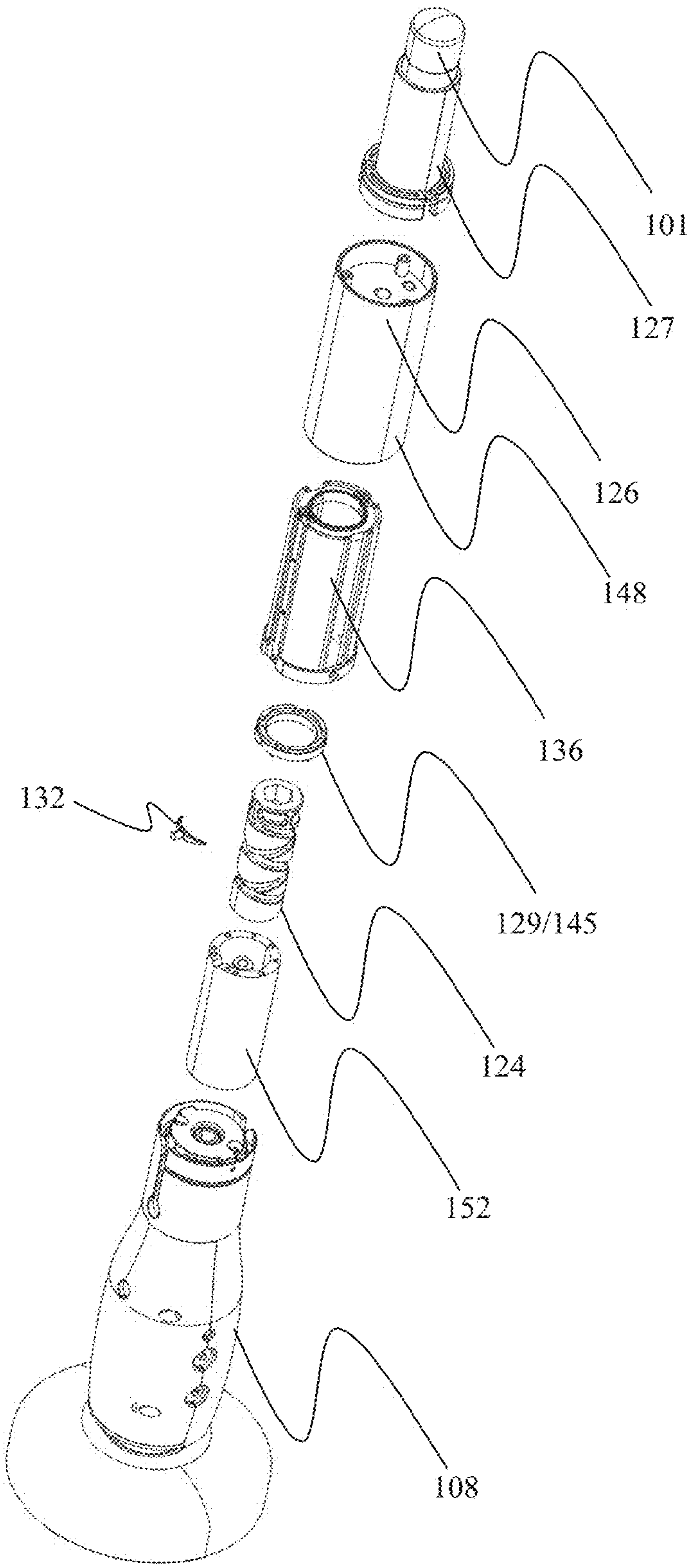
FIG. 29 is an exploded perspective view of the reciprocating stimulation device of FIG. 13-19.

FIG. 29 is an exploded perspective view of the reciprocating stimulation device of FIG. 13-19. In FIG. 29, the arrangement of the outer sleeve 126 may be more clearly seen. The outer sleeve 126 fits around the inner sleeve 136 and the guide pin 132 engages with the grooves of the screw 124 which is coupled to the outer sleeve 126, through the inner sleeve 136 such that the outer sleeve 126 may exhibit a reciprocating motion as the screw 124 rotates and this reciprocating motion may be passed to the support 127 and the stimulation component 101. FIG. 20 is a cutaway view of a reciprocating stimulation device 100C in accordance with exemplary embodiments of the present invention. As with the arrangement of FIG. 13, the top of the screw 124 is directly coupled to the loaded member 103 and so the screw moves up and down but does not turn. Instead, the nut 122 is held in place with respect to the motor 107, in terms of the up-and-down direction, but is free to rotate. The rotational force of the motor 107 is used to spin the nut 122 and the spinning of the nut 122 pushes the screw 124 up and down without rotating the screw 124. It is to be assumed that to the extent that one or more elements of the device are not described in detail with respect to this or other figures, those elements may be at least similar to corresponding elements described elsewhere within the present disclosure. The conducive subassembly 104 may be omitted within this configured.

Figure 21:
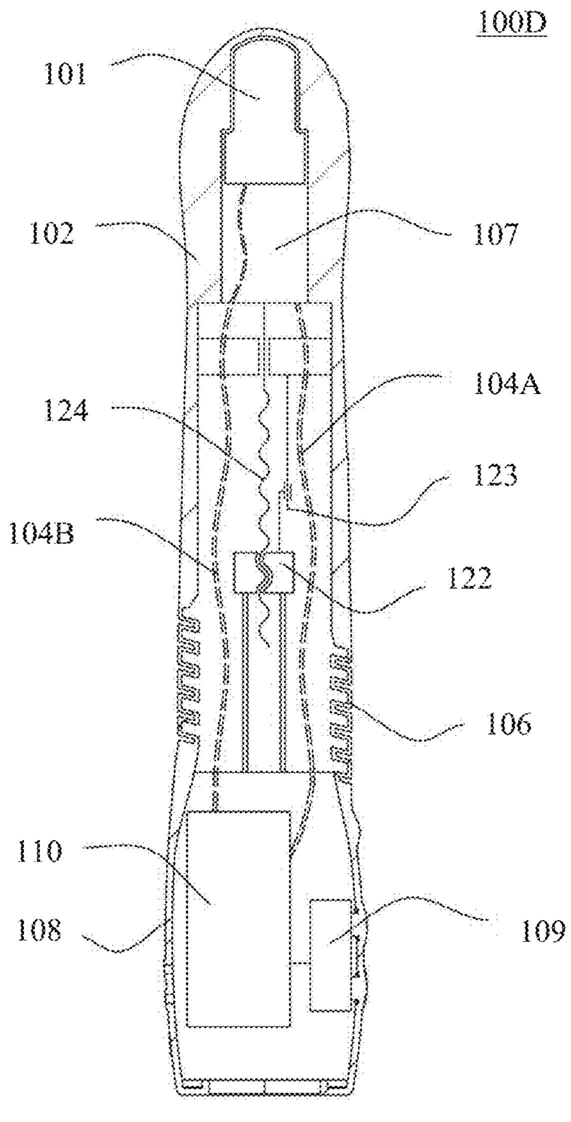
FIG. 21 is a cutaway view of a reciprocating stimulation device in accordance with exemplary embodiments of the present invention.

FIG. 21 is a cutaway view of a reciprocating stimulation device 100D in accordance with exemplary embodiments of the present invention. According to this approach, the rotating motor 107 is disposed at a top section of the device 100D, for example, within the stimulation body 102 and proximate to the stimulation component 101. The power supply/battery 110 may still be disposed within the handle portion 108 and a first conductive subassembly 104A may be used to carry power from the battery 110 to the rotating motor 107. A second conductive subassembly 104B may still be used to carry power from the battery to the stimulation component 101. The rotating motor 107 may spin the screw 124 from the top, rather than from the bottom as was shown in other arrangements. The nut 122 may be fixed to the handle portion 108 of the device 100D and in this arrangement, the nut 122 is fixedly disposed so as not to spin. Thus, as the screw 124 spins within the stationary nut 122, the screw is pushed or pulled, relative to the nut, to create the reciprocating movement. The moving screw 124 pushes the rotating motor 107 within the stimulation body 102 and thus the device 100D exhibits stretching and contracting. A guiding member 123 extending between the nut 122 and a fixed ring within the stimulation body 102 may be used to add stability to the device 100D as it exhibits reciprocating motion. Once again, the screw 124 may be threaded with dual-helical grooves that meet at the top and bottom so that movement may be in both directions while the rotating motor 107 spins in just one direction.

Figure 22:
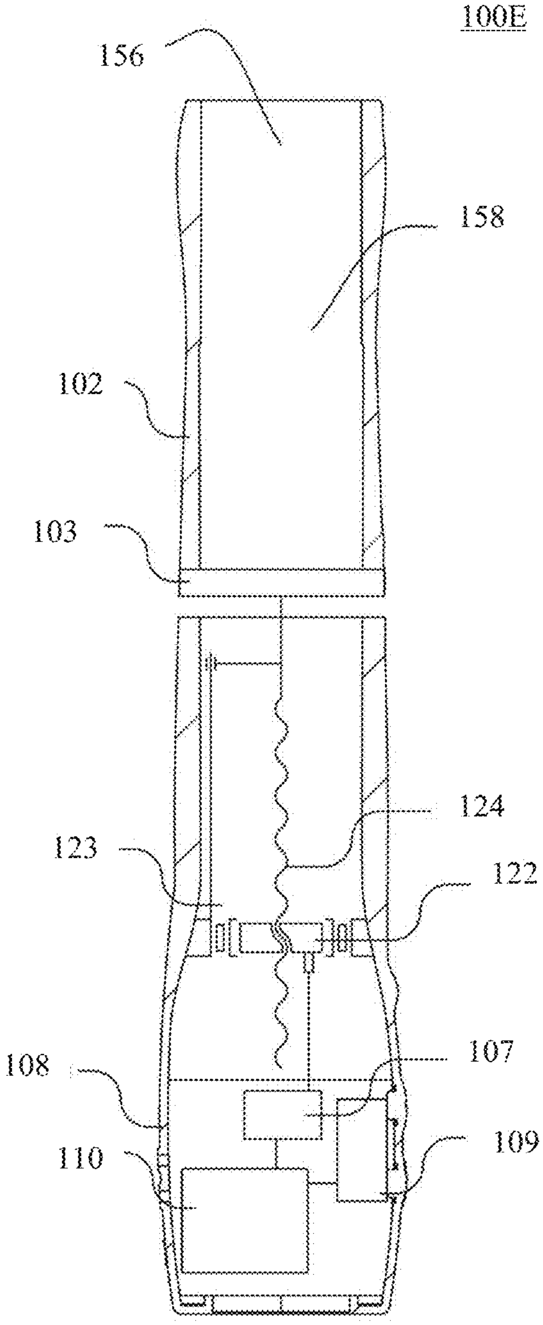
FIG. 22 is a cutaway view of a reciprocating stimulation device in accordance with exemplary embodiments of the present invention.

FIG. 22 is a cutaway view of a reciprocating stimulation device 100E in accordance with exemplary embodiments of the present invention. According to this approach, the handle portion 108 may be substantially similar to what is shown in FIG. 20 with a spinning nut 122 that is driven by the rotating motor 107. The spinning nut 122 causes the screw 124 to raise and lower, which in turn moves the loaded member 103 in a reciprocating motion. The stimulation body 102 here is shaped as a cup that includes an elongated channel 158 that is open at the distal end. According to this approach, the stretchable tube 106 may be omitted. A guiding member 123 may also be used here, as is shown, to add stability to the screw 124 and loaded member 103. Once again, the nut 124 may be threaded with dual-helical grooves that meet at the top and bottom so that movement may be in both directions while the rotating motor 107 spins in just one direction.

Figure 23:
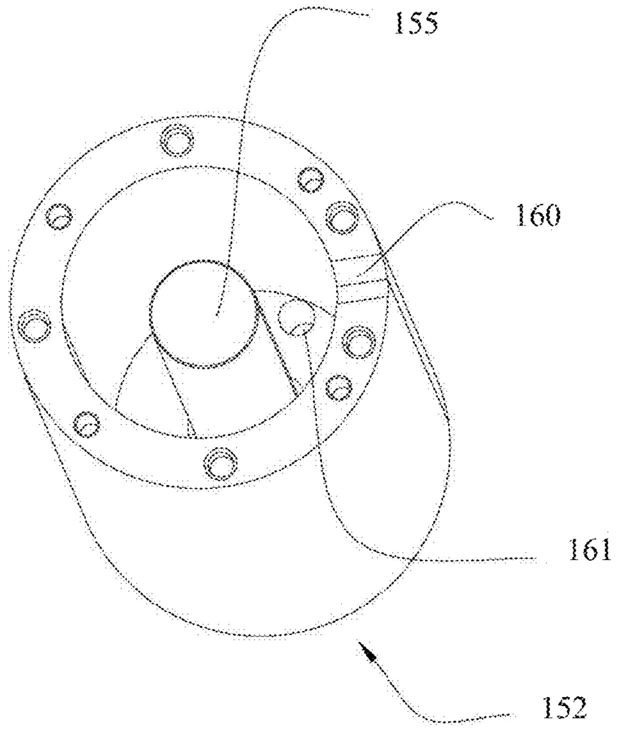
FIG. 23 is a perspective view illustrating the container such as that shown in FIG. 14.

FIG. 23 is a perspective view illustrating the container 152 discussed above, for example, with reference to FIG. 14. As can be appreciated from the above, the container 152 includes the limited post 155 in a center thereof as well as an outer cylindrical shell that includes a container groove 160. An opening on the top of the container 152 may be threaded through by the screw 124. The air vents 161 may be seen within the bottom cap thereof.

Figure 24:
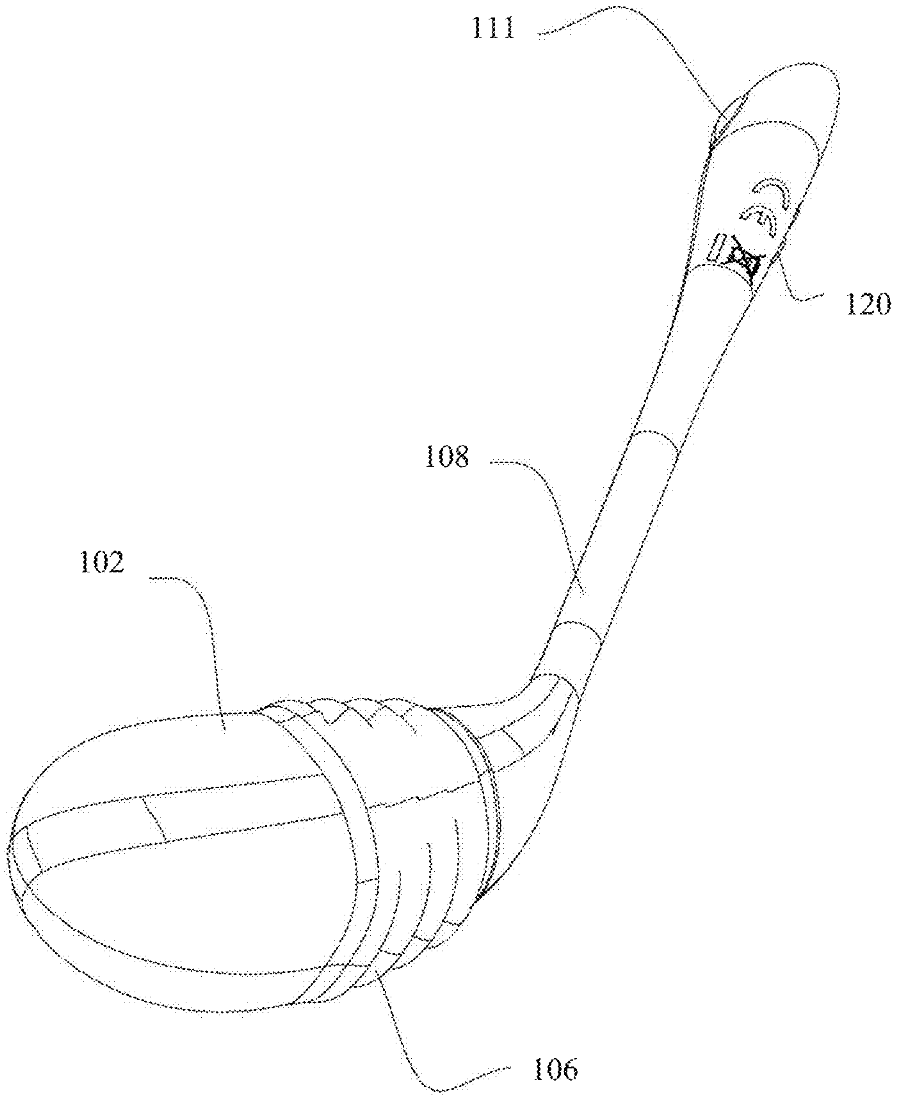
FIG. 24 is a perspective view illustrating an exemplary embodiment of the reciprocating stimulation device of FIG. 21, according to an alternate arrangement.
Figure 25:
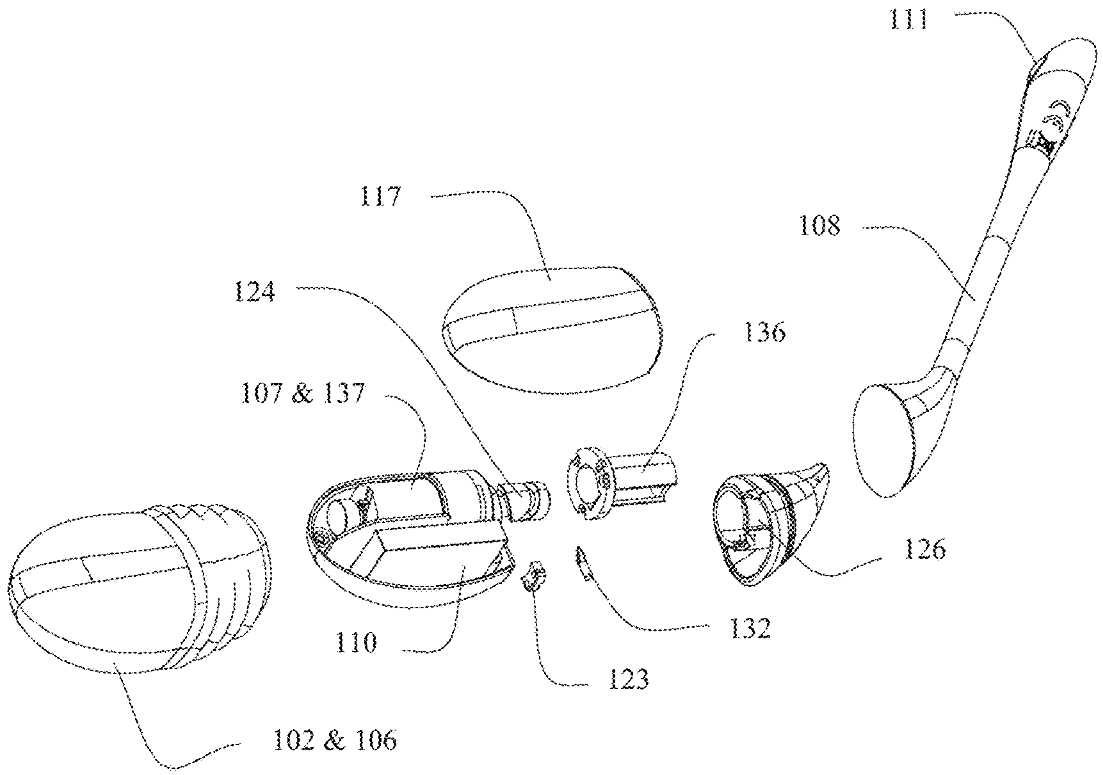
FIG. 25 is an exploded view illustrating an exemplary embodiment of the reciprocating stimulation device of FIG. 21, according to the alternate arrangement.
Figure 26:
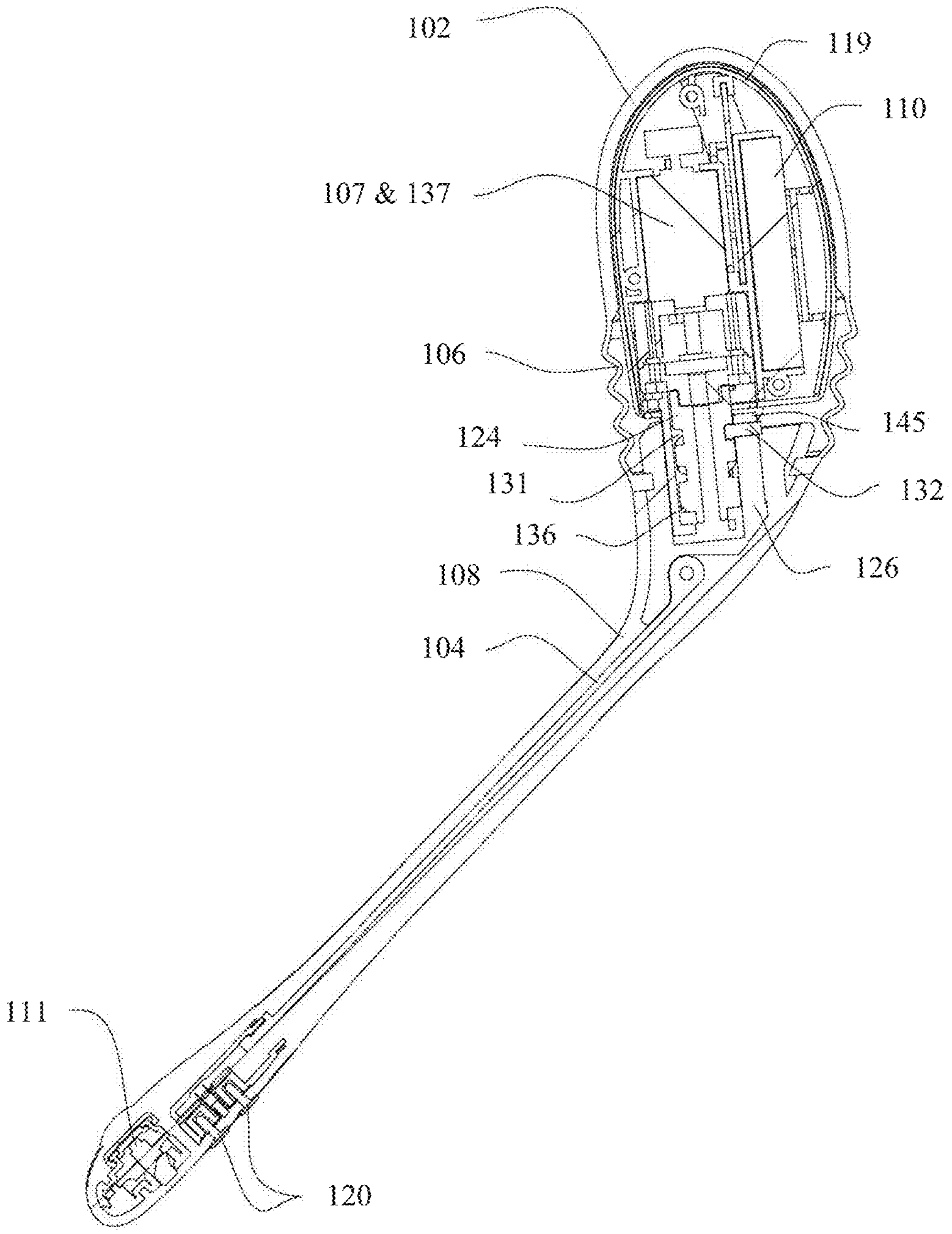
FIG. 26 is an exploded view illustrating an exemplary embodiment of the reciprocating stimulation device of FIG. 21, according to the alternate arrangement.

FIGS. 24, 25, 26, and 29 illustrate an exemplary embodiment of the reciprocating stimulation device of FIG. 21. In these figures, FIG. 24 shows a perspective view, FIG. 25 shows an exploded view, and FIG. 26 shows a cutaway view. FIG. 29 is an exploded perspective view. As can be seen from FIG. 24, the reciprocating stimulation device includes a stimulation body 102 that is connected to a handle portion 108 by a stretchable tube 106. The handle portion 108 includes a charging port 120 and a button 111. As can be seen from FIG. 25, the shell 117 encloses a battery 110 as well as a rotating motor 107 and a vibrating motor 137 that are disposed together. The screw 124 is coupled with the rotating motor 107, in one embodiment, the rotating motor 107 may be a bidirectional motor, with one end connected to an eccentric wheel to achieve vibration effect, and the other end providing torque to the screw. An outer sleeve 126 is held to the screw 124 by a fixing member 145. A guide pin 132 engages with dual-helical grooves 131 of the screw 124. An inner sleeve 136 is disposed over the screw 124 such that as the screw 124 rotates by the rotating motor 107, the guide pin 132 moves in the reciprocating manner thereby pushing the stimulation body 102 towards and away from the outer sleeve 126 carrying the handle portion 108 along with it.

The guide pin 132 may be part of a guiding member assembly that includes a linear guiding hole with corresponding raised portions so that the guide pin 132 may be held in its proper position.

This mechanism can be well appreciated from FIG. 26 in which the conductive assembly 104 can further be seen as establishing an electrical connection between the buttons 111 and the charging port 120 to the various electrical components disposed within the stimulation body 102, including the rotating motor 107/vibrating motor 137, the battery 110, etc. In other ways, the arrangement of these figures may be at least similar to what is shown in FIG. 21.

As can be seen from FIG. 26, the bidirectional motor 107 or vibrating motor 137 is placed inside the stimulation body 102. The stimulation body 102 can be configured to be inserted into various parts of the human body, such as the vagina and anus. When holding the reciprocating stimulation device to insert the stimulation body 102 into the human body, due to the rotation of the screw 124 and the fixation of the outer sleeve 126 by hand or muscle grip, the stimulation body 102 constantly moves back and forth in the human body while providing vibration stimulation under the action of the eccentric wheel.

Figure 28:
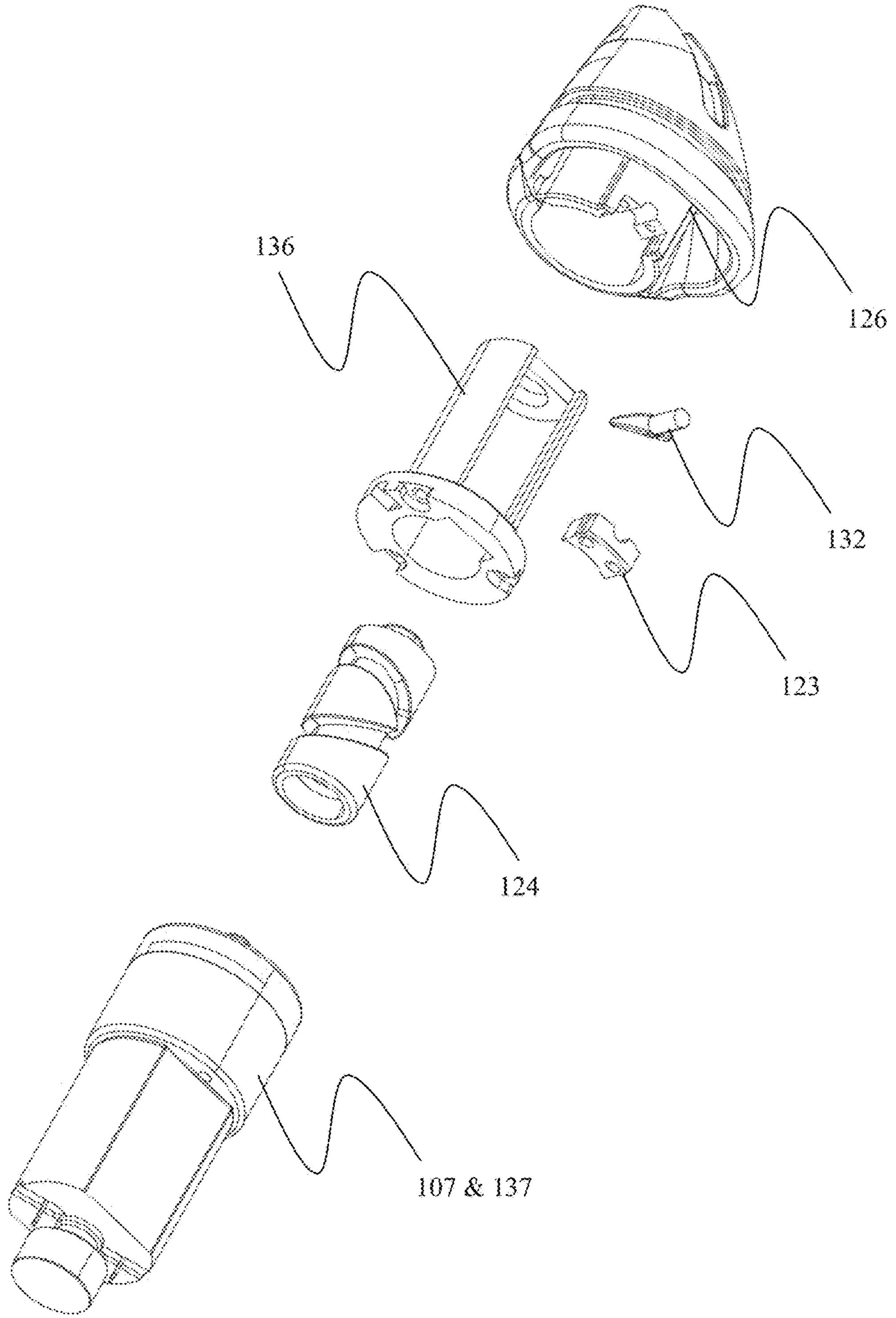
FIG. 28 is an exploded perspective view of the reciprocating stimulation device of FIG. 21, according to the alternate arrangement of FIGS. 24-26.

FIG. 28 is an exploded perspective view of the reciprocating stimulation device of FIG. 21, according to the alternate arrangement of FIGS. 24-26. As may be well appreciated from this figure, the guide pin 132 extends through an opening in the inner sleeve 136 to engage with the grooves of the screw 124 and the guide pin is held in place, relative to the inner sleeve 136, by the guiding member 123. In this way, the rotation of the screw 124 forces the guide pin 132 in a reciprocating manner as the guide pin 132 is prevented from spinning by the guiding member 123 and so the outer sleeve 126 is pushed and pulled by the reciprocating motion of the pin 132. The outer sleeve 126 is then fixed to the handle portion 108, which is not shown in this figure for the purpose of providing a simplified description.

Figure 27:
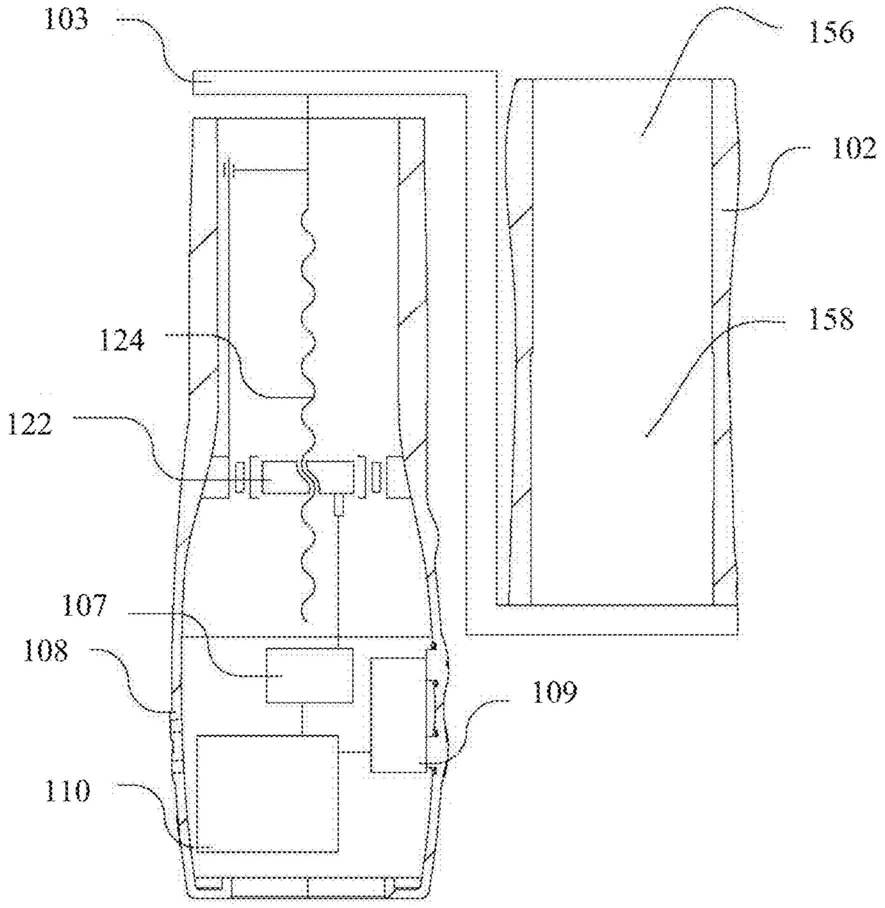
FIG. 27 is a cutaway view of an alternative arrangement of the reciprocating stimulation device of FIG. 22.

FIG. 27 is a cutaway view of an alternative arrangement of the reciprocating stimulation device of FIG. 22. According to this approach, the stimulation body 102 including the elongated channel 158 need not be disposed coaxially with the handle portion 108, and instead, it may extend in parallel therewith. The loaded member 103 may communicate the reciprocating motion from the screw 124 to the stimulation body 102. In other ways, the arrangement of this figure may be at least similar to what is shown in FIG. 22. Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A reciprocating stimulation device, comprising:
a proximal part;
a distal part including a vibration component;
a stretchable tube connecting an exterior of the distal part to an exterior of the proximal part so as to form a stimulation body configured to be inserted into an orifice of a human; and
a drive component configured to drive the distal part in a reciprocating manner relative to the proximal part;

wherein the stretchable tube is configured to stretch and shrink as the distal part moves in the reciprocating manner, thereby resulting in reciprocating stimulation to a body portion of the human; and
wherein the drive component is configured to remain within the orifice of the human as the distal part of the stimulation body reciprocates relative to the proximal part.

2. The reciprocating stimulation device of claim 1, wherein the drive component comprises:
a rotating motor; and
a linear reciprocating mechanism configured to drive the distal part in the reciprocating manner in response to rotation of the rotating motor.

3. The reciprocating stimulation device of claim 2, wherein the linear reciprocating mechanism includes a screw coupled to the rotating motor so as to turn by the rotation of the rotating motor, the screw having a groove on its outer surface.

4. The reciprocating stimulation device of claim 3, wherein the linear reciprocating mechanism further includes a nut coupled with the distal part and comprising at least one longitudinal force receiving structure that is configured to move within the groove.

5. The reciprocating stimulation device of claim 4, wherein the groove of the screw is a dual-helical groove including a levorotatory helical groove and a dextrorotatory helical groove, and the levorotatory helical groove and the dextrorotatory helical groove are interlaced with each other and connected to each other end-to-end.

6. The reciprocating stimulation device of claim 5, further comprising an inner sleeve at least partially surrounding the screw;
wherein the nut includes an outer sleeve that is coupled with the distal part and that at least partially surrounds the inner sleeve;
wherein a portion of the at least one longitudinal force receiving structure engages with the dual-helical groove of the screw through a longitudinal linear groove in the inner sleeve, and wherein another portion of the at least one longitudinal force receiving structure engages with the outer sleeve; and
wherein the inner sleeve is configured to remain stationary as the screw rotates thereby resulting in reciprocating movement of the at least one longitudinal force receiving structure to push and pull the distal part therewith.

7. The reciprocating stimulation device of claim 1, further comprising a handle including one or more buttons and a charging port that are electrically connected to the drive component within the stimulation body via a conductive assembly that is disposed within an interior of the proximal part.

8. A reciprocating stimulation device, comprising:
a proximal part;
a distal part configured to stimulate a body portion of a human, the distal part including a rotating motor disposed therein;
a linear reciprocating mechanism configured to drive the distal part to move in a reciprocating manner via a first shaft of the rotating motor; and
a stretchable tube that connects an exterior of the distal part to an exterior of the proximal part, wherein the stretchable tube is configured to stretch and shrink as the distal part moves in the reciprocating manner with respect to the proximal part.

9. The reciprocating stimulation device of claim 8, wherein the rotating motor further includes a second shaft coupled with an eccentric wheel, wherein the eccentric wheel is configured to generate vibration as the rotating motor rotates.

10. The reciprocating stimulation device of claim 8, wherein the linear reciprocating mechanism includes a screw coupled to the rotating motor so as to turn by the rotation of the rotating motor, the screw having a groove on its outer surface.

11. The reciprocating stimulation device of claim 10, wherein the linear reciprocating mechanism includes a nut adapted to have one or more guide structures that move within the groove, wherein the nut is mated to the proximal part of the reciprocating stimulation device; and wherein the proximal part of the reciprocating stimulation device is configured to remain fixed to the nut such that the distal part, which is a stimulating body, moves in a linear reciprocating manner with respect thereto.

12. The reciprocating stimulation device of claim 10, wherein the screw includes a dual-helical groove including a levorotatory helical groove and a dextrorotatory helical groove, and the levorotatory helical groove and the dextrorotatory helical groove are interlaced with each other and connected to each other end-to-end.

13. The reciprocating stimulation device of claim 8, wherein the linear reciprocating mechanism includes a screw coupled to the rotating motor so as to turn by the rotation of the rotating motor, the screw having a helical groove on its outer surface;

wherein the reciprocating stimulation device further comprises an inner sleeve at least partially surrounding the screw;

wherein the linear reciprocating mechanism further includes a nut that includes an outer sleeve that at least partially surrounds the inner sleeve;

wherein the reciprocating stimulation device further includes a guide pin having a first end engaging with the helical groove of the screw through a longitudinal linear groove in the inner sleeve, and a second end engaging with the outer sleeve; and wherein the outer sleeve is configured to remain stationary as the screw rotates and to prevent the guide pin from rotating with the screw such that the screw moves in a rotary reciprocating manner relative to the outer sleeve and pushes and pulls the rotating motor therewith.

14. The reciprocating stimulation device of claim 13, wherein the outer sleeve is disposed at least partially within a static portion of the reciprocating stimulation device that is static relative to the movement in the rotary reciprocating manner of the screw, and a stimulation body is spaced apart from the static portion of the reciprocating stimulation device by a gap.

15. The reciprocating stimulation device of claim 14, wherein the inner sleeve crosses the gap between the stimulation body and the static portion of the reciprocating stimulation device.

16. The reciprocating stimulation device of claim 8, further comprising a handle including one or more buttons and a charging port that are electrically connected to a controller disposed within the distal part via a conductive assembly that is disposed within an interior of the proximal part.

17. The reciprocating stimulation device of claim 16, wherein the stretchable tube is configured to prevent foreign objects from entering a gap between the distal part and the proximal part.

18. The reciprocating stimulation device of claim 8, further comprising a guiding member configured to prevent a guide pin from rotating with a screw, wherein the guiding member is fixed to the guide pin and fits snugly within a longitudinal linear groove of an inner sleeve.

19. The reciprocating stimulation device of claim 8, wherein the distal part further includes a battery for supplying power to the rotating motor.

20. The reciprocating stimulation device of claim 8, wherein the distal part further includes a vibrating motor.

* * * * *